United States Patent [19]

Okuyama et al.

[11] Patent Number: 5,341,243
[45] Date of Patent: Aug. 23, 1994

[54] ZOOM LENS OF REAR FOCUS TYPE

[75] Inventors: Atsushi Okuyama, Tokyo; Kenichi Kimura; Saburo Sugawara, both of Kanagawa, all of Japan

[73] Assignee: Canon Kabushiki Kaisha, Tokyo, Japan

[21] Appl. No.: 885,658

[22] Filed: May 19, 1992

[30] Foreign Application Priority Data

Jun. 4, 1991 [JP] Japan .................................. 3-159724
Jun. 4, 1991 [JP] Japan .................................. 3-159725

[51] Int. Cl.$^5$ ............................................. G02B 15/14
[52] U.S. Cl. ..................................... 359/687; 359/684
[58] Field of Search ........................ 359/677, 684, 687

[56] References Cited

U.S. PATENT DOCUMENTS 5,009,492 4/1991 Hamano ............................... 359/684
5,134,524 7/1992 Hamano et al. ..................... 359/687

FOREIGN PATENT DOCUMENTS 58-136012 8/1983 Japan .
58-160913 9/1983 Japan .
62-24213 2/1987 Japan .
63-44614 2/1988 Japan .

Primary Examiner—Scott J. Sugarman
Attorney, Agent, or Firm—Fitzpatrick, Cella, Harper & Scinto

[57] ABSTRACT

A zoom lens of the rear focus type is disclosed, comprising first, second, third and fourth lens units of positive, negative, positive and positive refractive powers in this order from the object side, zooming from the wide-angle end to the telephoto end being performed by moving the second lens unit toward the image side, compensation for the image shift and focusing being performed by moving the fourth lens unit, and the zoom lens satisfying the following conditions:

$$2.2 < |Fb/FW|$$

$$0.8 < |Fb/f3,4| < 1.1$$

where Fb is a back focal distance in the wide-angle end, FW is the shortest focal length of the entire lens system, and f3,4 is a composite focal length of the third and fourth lens units.

9 Claims, 14 Drawing Sheets

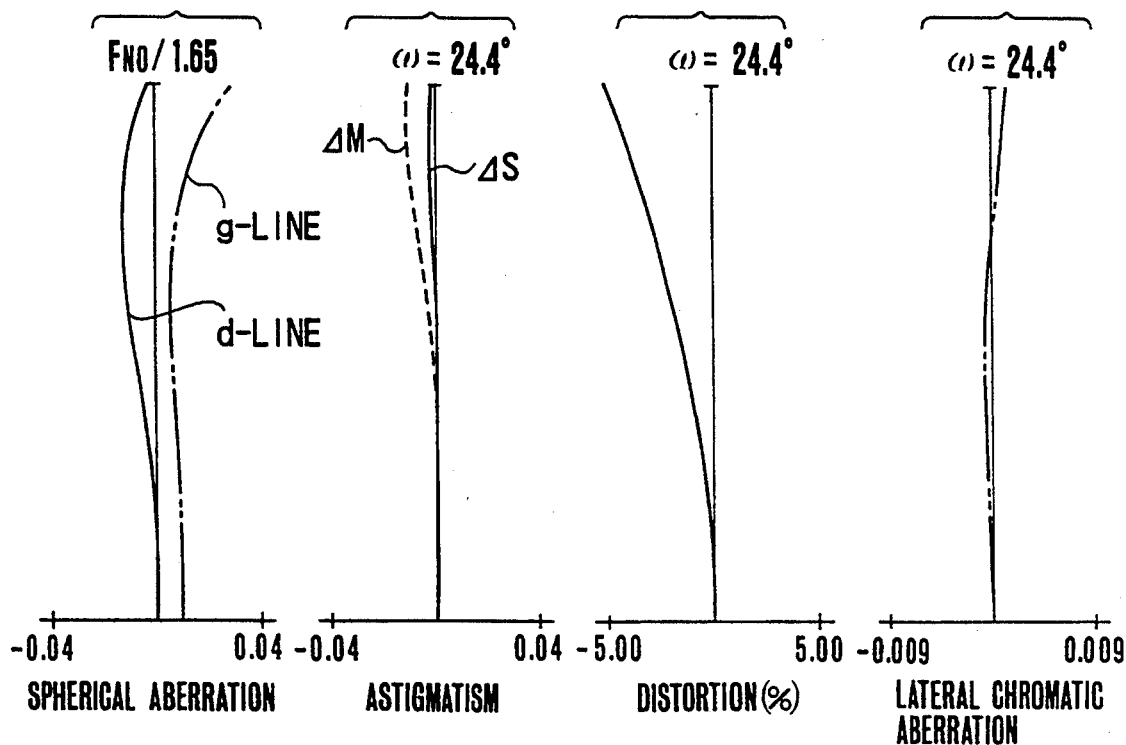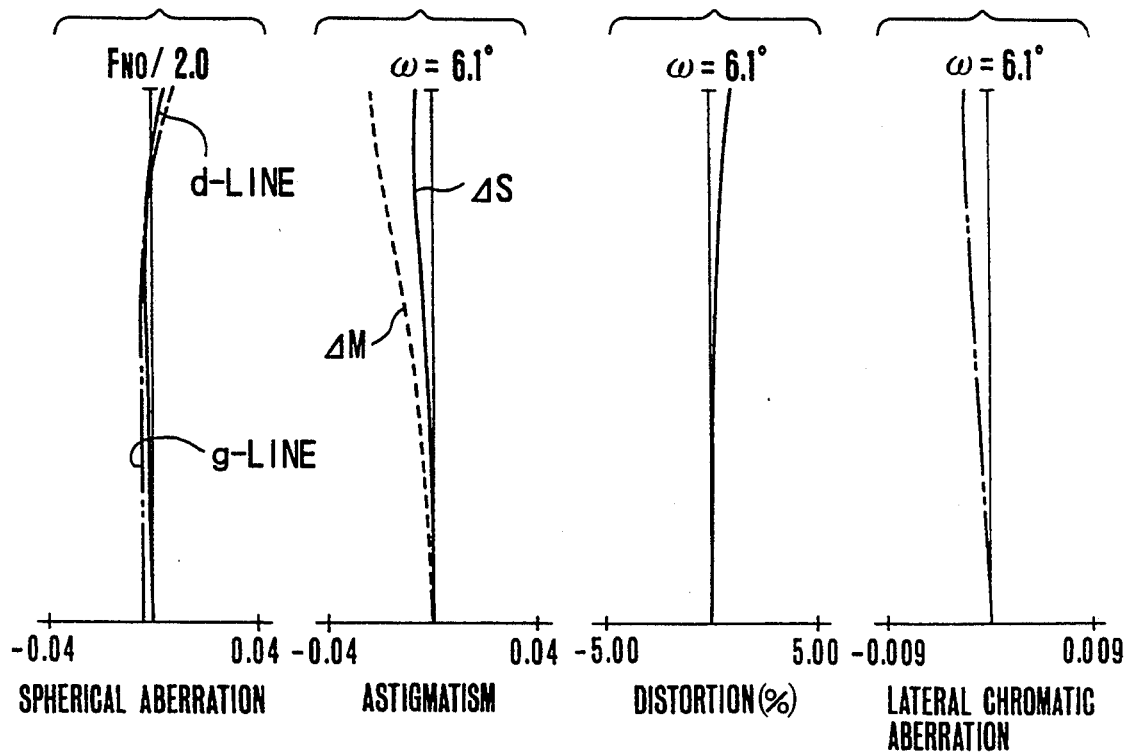

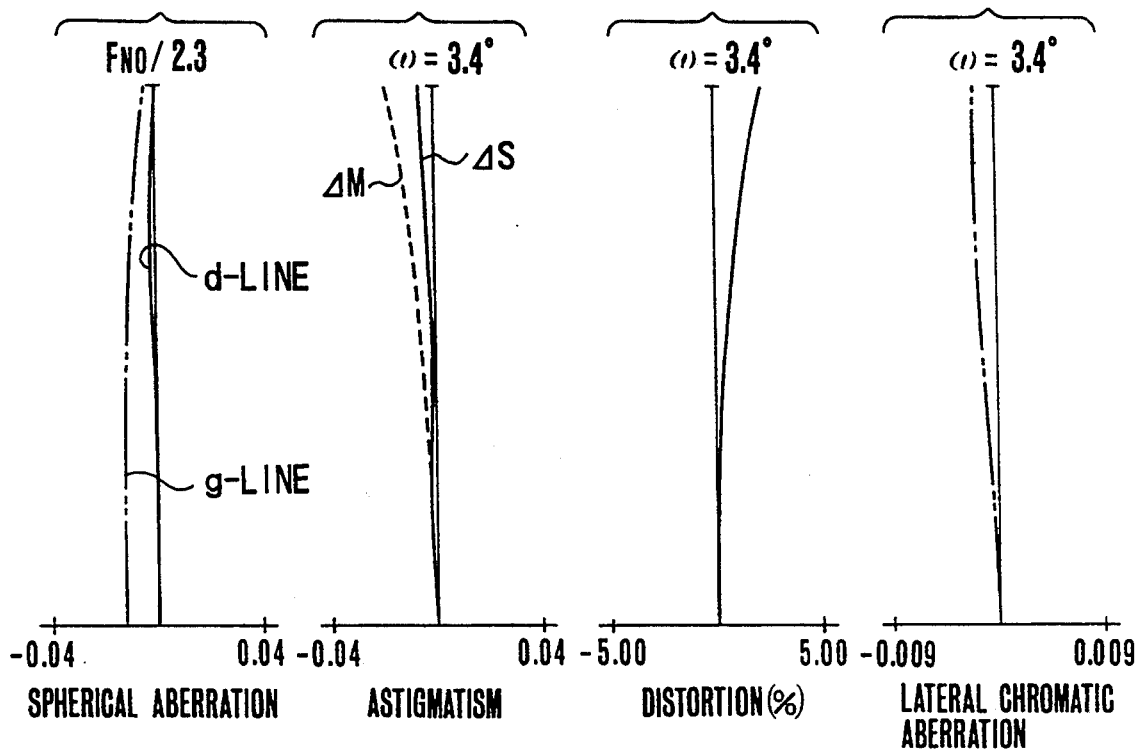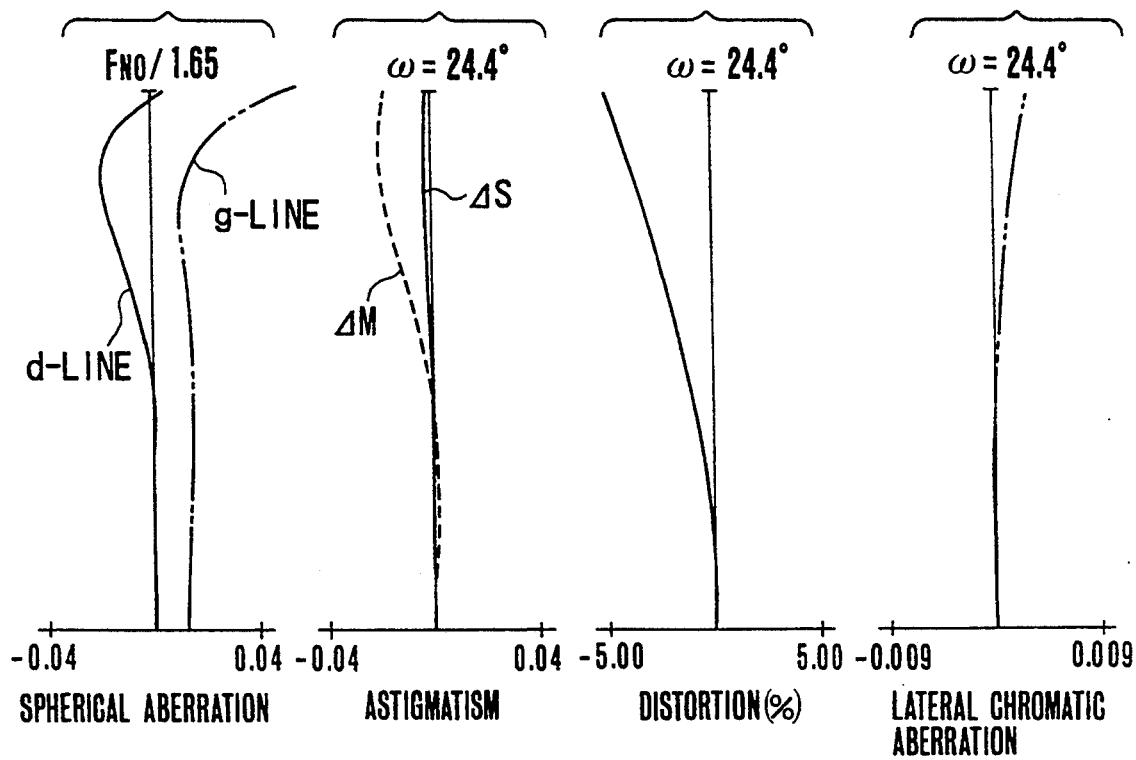

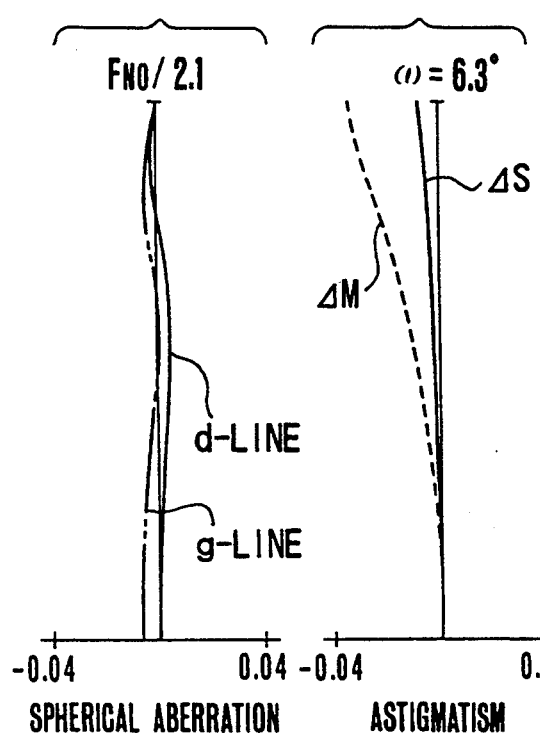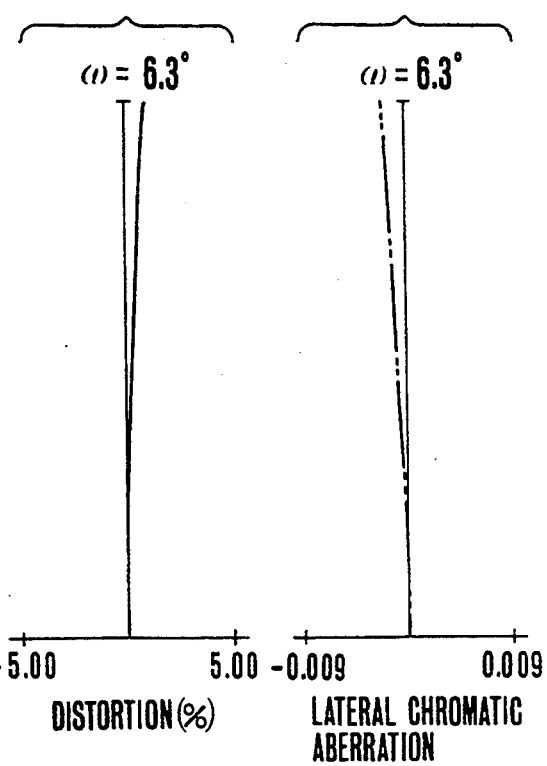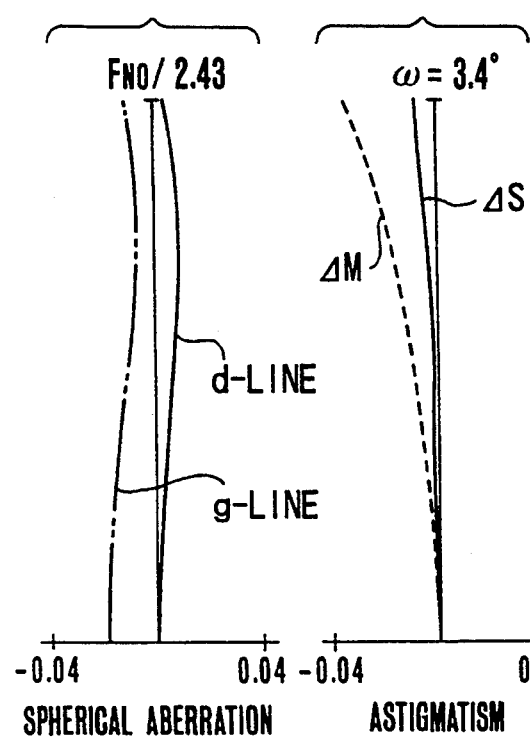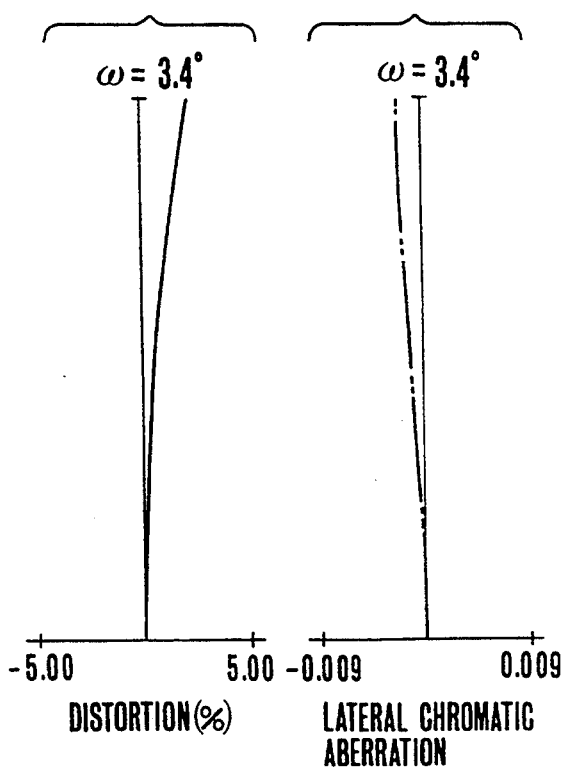

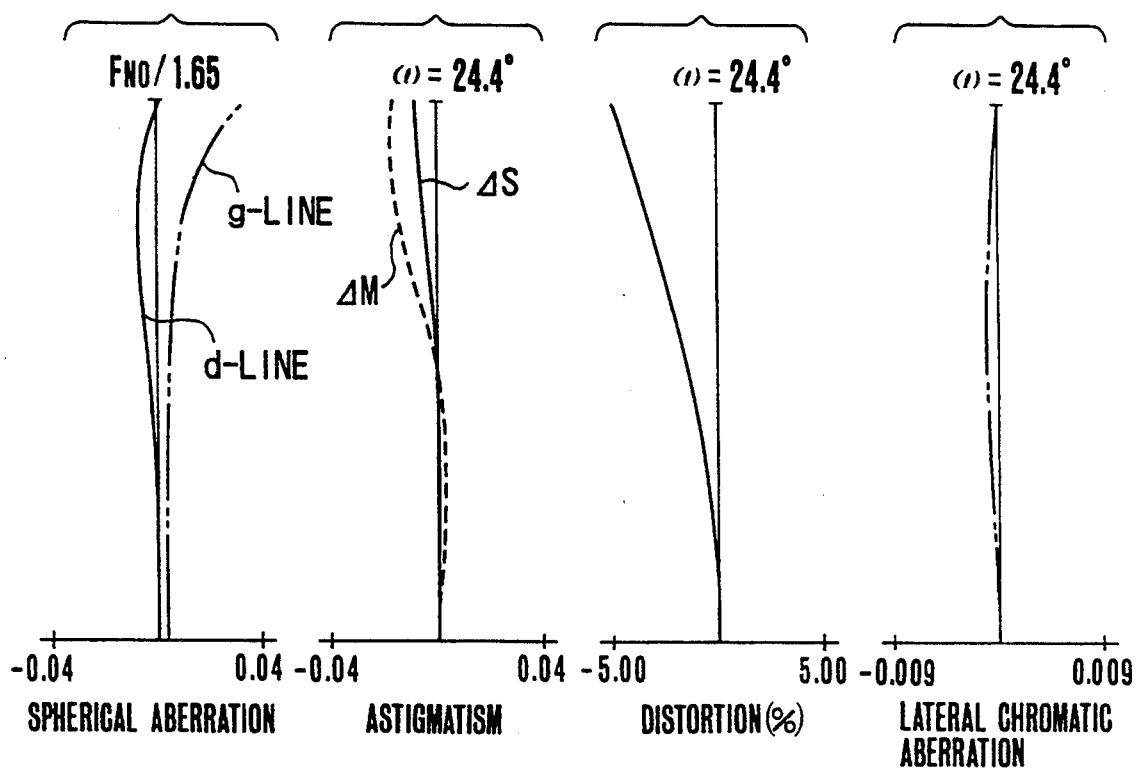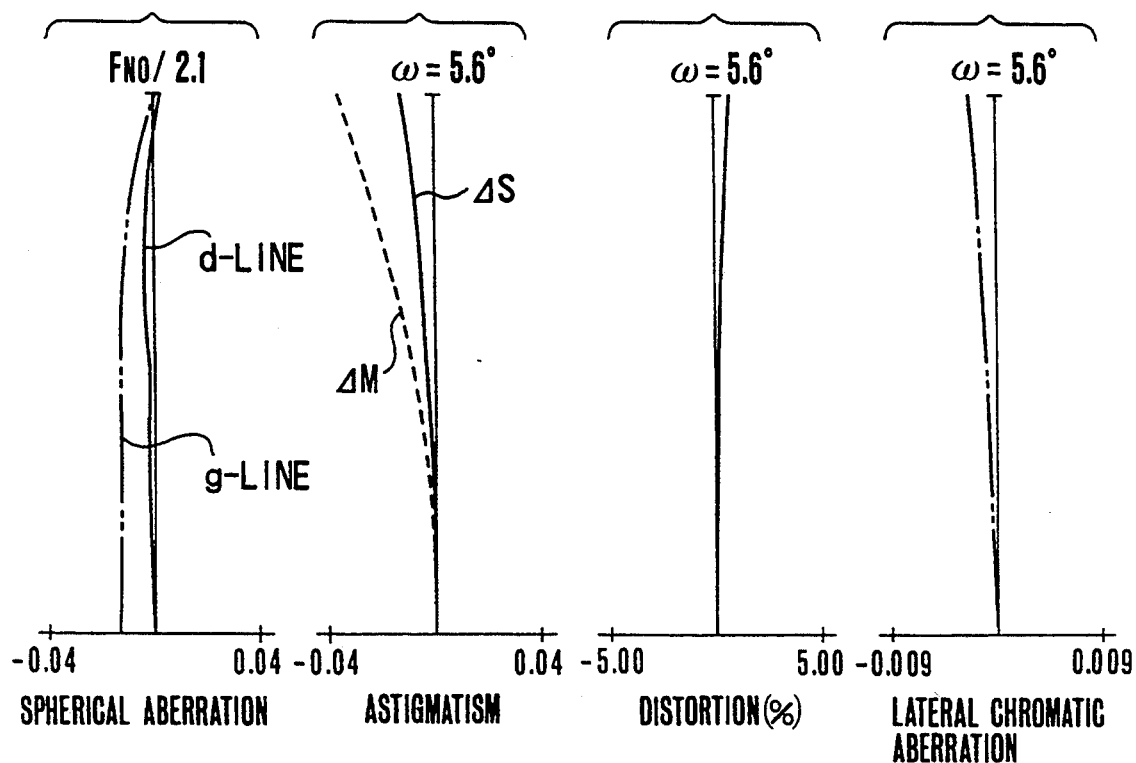

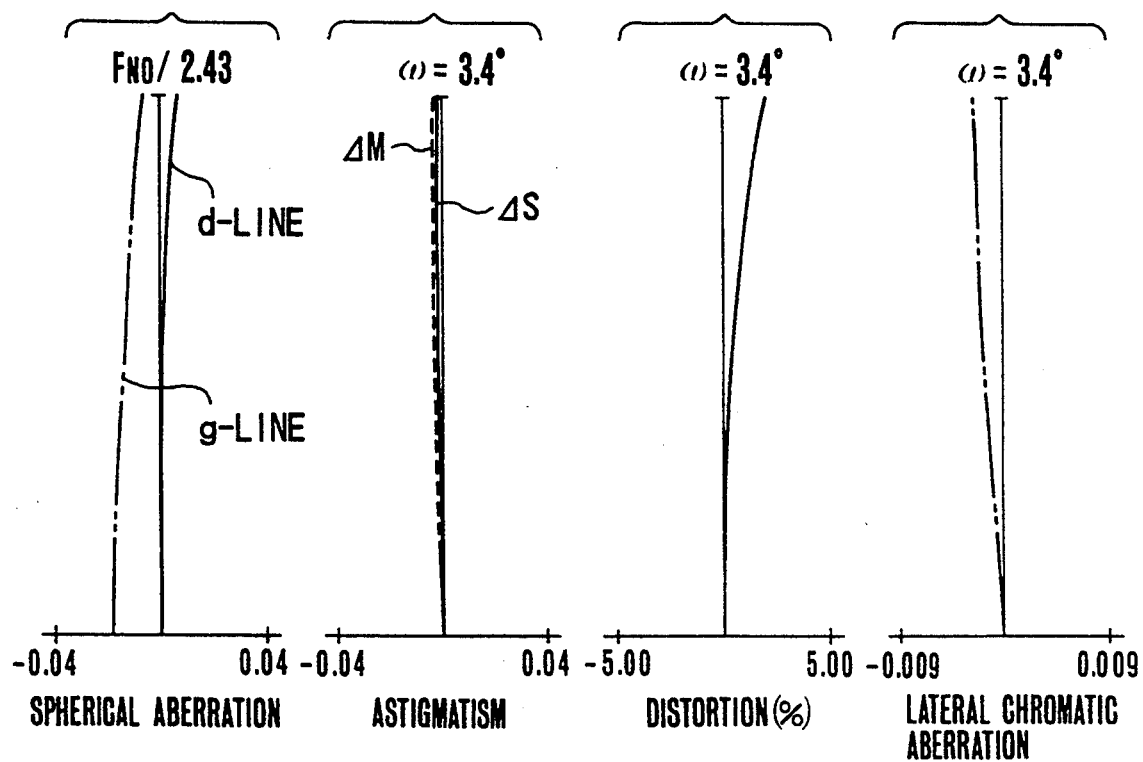

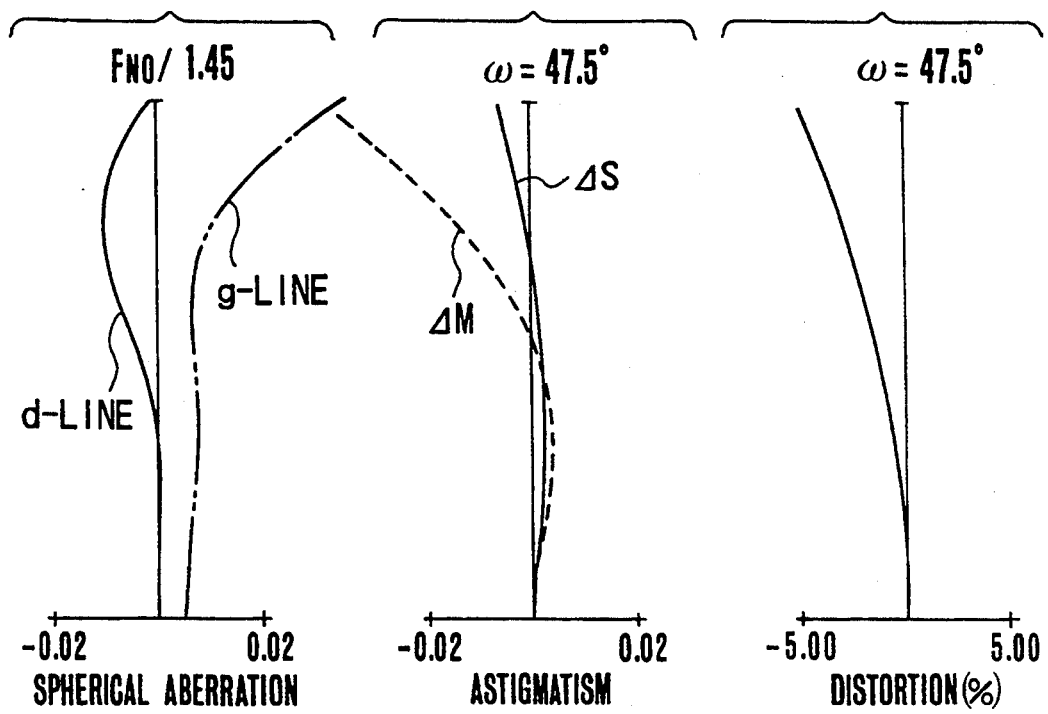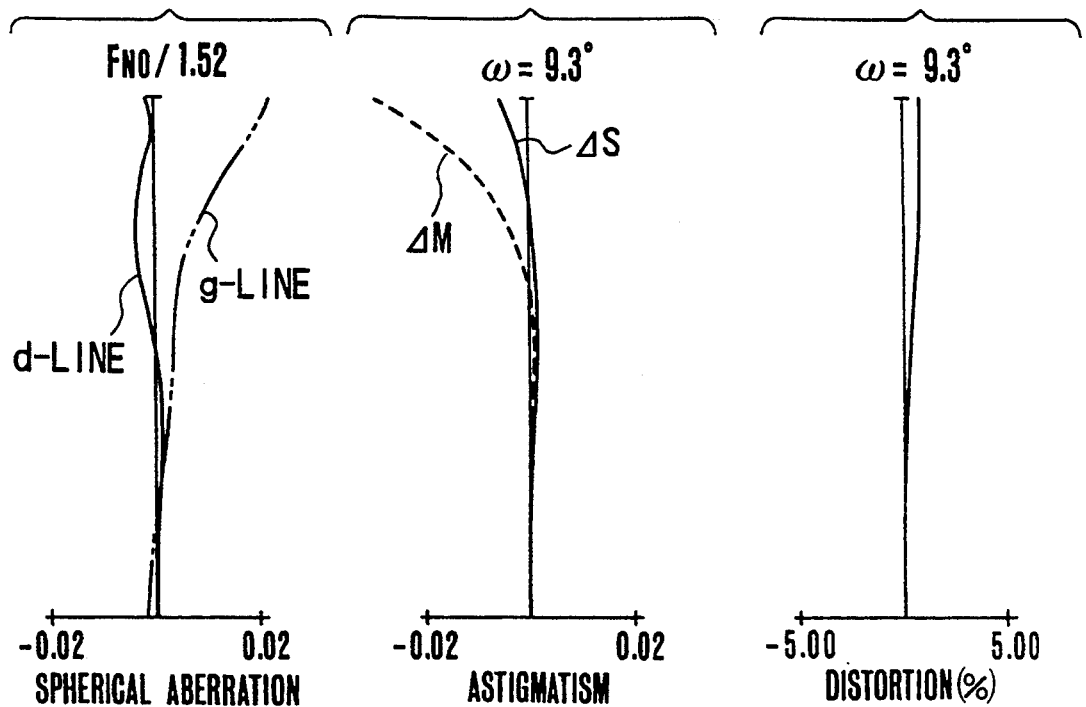

Fno/ 1.8
g-LINE
d-LINE
-0.02    0.02
SPHERICAL ABERRATION

ω = 3.2°
ΔS
ΔM
-0.02    0.02
ASTIGMATISM

ω = 3.2°
-5.00    5.00
DISTORTION (%)

Fno/ 2.05
g-LINE
d-LINE
-0.02    0.02
SPHERICAL ABERRATION

ω = 47.5°
ΔS
ΔM
-0.02    0.02
ASTIGMATISM

ω = 47.5°
-5.00    5.00
DISTORTION (%)

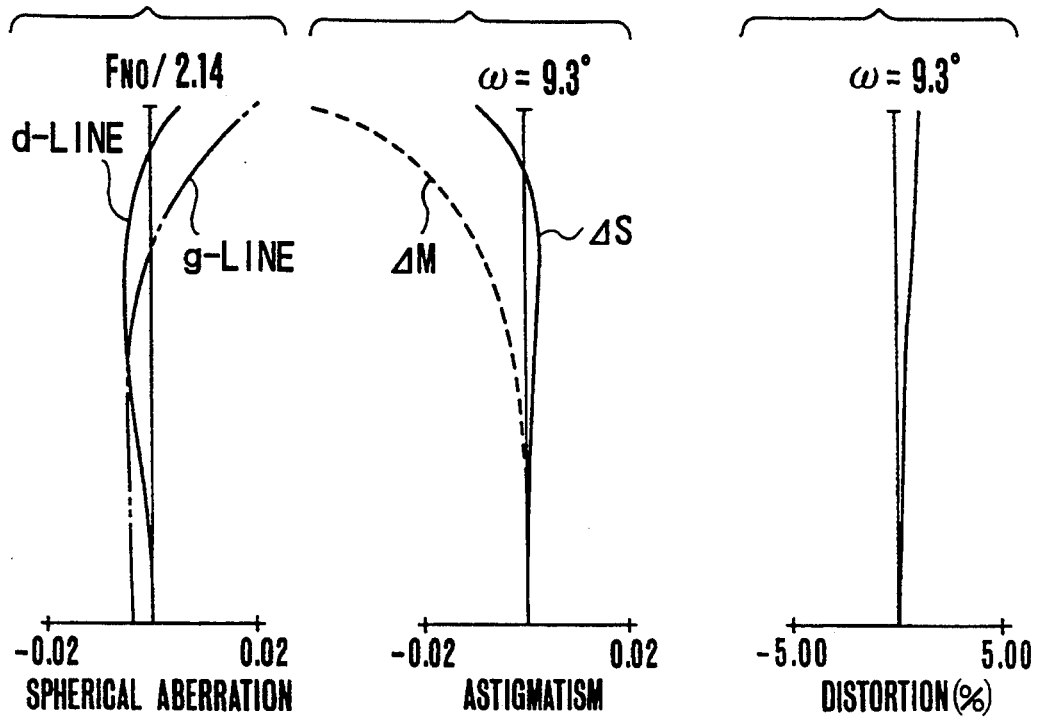
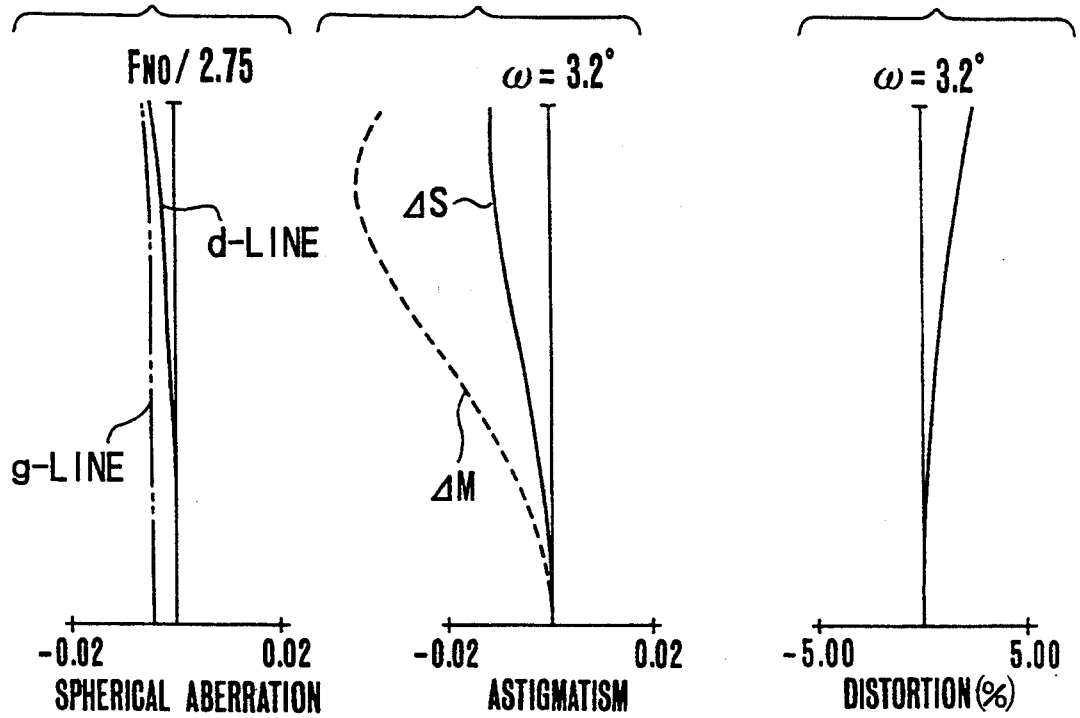

F$_{NO}$/ 2.05
d-LINE
g-LINE
-0.02  0.02
SPHERICAL ABERRATION

ω = 47.5°
ΔM
ΔS
-0.02  0.02
ASTIGMATISM

ω = 47.5°
-5.00  5.00
DISTORTION(%)

F$_{NO}$/ 2.11
d-LINE
g-LINE
-0.02  0.02
SPHERICAL ABERRATION

ω = 11.4°
ΔS
ΔM
-0.02  0.02
ASTIGMATISM

ω = 11.4°
-5.00  5.00
DISTORTION(%)

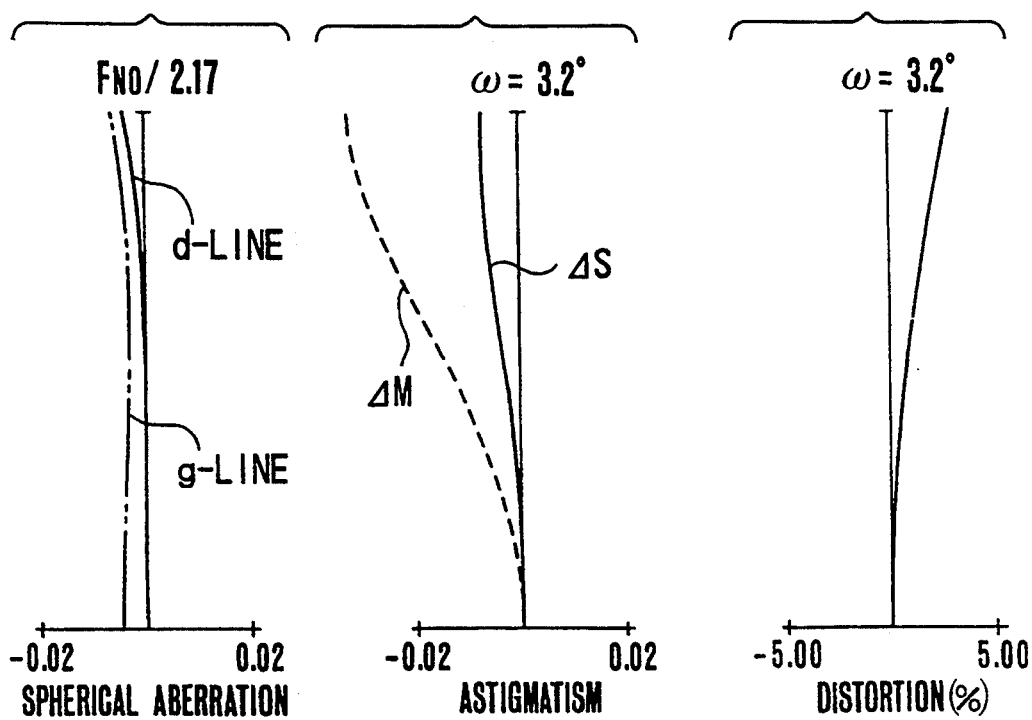

ZOOM LENS OF REAR FOCUS TYPE

BACKGROUND OF THE INVENTION

1. Field of the Invention

This invention relates to zoom lenses of the rear focus type and, more particularly, to zoom lenses of the rear focus type which have as high a range of magnification as 8 and as large an aperture ratio as 1.6–2.4 in F-number with a short total length, and are to be used in photographic cameras, video cameras, or cameras for broadcasting.

2. Description of the Related Art

In the field of zoom lenses for photographic cameras or video cameras, an increasing number of ones in which a lens unit other than the first, when counted from the object side, is moved to perform focusing, or which employ the so-called rear focus type, have been proposed.

In general, the use of the rear focus type decreases the effective diameter of the first lens unit of the zoom lens from that of a zoom lens which performs focusing by moving the first lens unit. This makes it easier to minimize the bulk and size of the entirety of the lens system. Also, close-up photography, particularly supercloseup photography, becomes easy to carry out. Further, because the focusing lens unit is relatively small in size and light in weight, a weak driving power for that lens unit is sufficient. This leads to a possibility of performing rapid focusing.

Of the zoom lenses of the rear focus type having such advantages, for example, Japanese Laid-Open Patent Application No. Sho 63-44614 shows a so-called 4-unit zoom lens comprising, in the order from the object side, a first lens unit of positive refractive power, a second lens unit of negative refractive power for varying the magnification, a third lens unit of negative refractive power for compensating for the image shift with zooming, and a fourth lens unit of positive refractive power, wherein the third lens unit is made to move for focusing purposes. However, this zoom lens has to create a space that allows the third lens unit to move and there is a tendency to increase the total length of the entire lens system.

In Japanese Laid-Open Patent Application No. Sho 58-136012, the zooming section is constructed with three or more lens units, of which some are made movable for focusing.

In Japanese Laid-Open Patent Applications No. Sho 62-247316 and No. Sho 62-24213, the zoom lens has four lens units, i.e., a first lens unit, when counted from the object side, of positive refractive power, a second lens unit of negative refractive power, a third lens unit of positive refractive power and a fourth lens unit of positive refractive power, wherein the image magnification is varied by moving the second lens unit, and compensation for image shift and focusing are performed by moving the fourth lens unit.

In Japanese Laid-Open Patent Application No. Sho 58-160913, there are four lens units, i.e., the first lens unit, when counted from the object side, of positive refractive power, the second lens unit of negative refractive power, the third lens unit of positive refractive power and the fourth lens unit of positive refractive power, the first and second lens units are moved to vary the magnification, while the fourth lens unit is simultaneously moved to compensate for the image shift. Of these lens units, one or two or more lens units are moved to effect focusing.

The related art to the present invention is mentioned in U.S. Pat. No. 5,009,492 and U.S. patent application Ser. No. 534,241 filed on Jun. 7, 1990.

Recently, in the field of video cameras, the trend to minimize the size of the image sensor in the solid-state form (CCD) is advancing. For example, in place of the conventional ½ in. or ⅓ in. solid-state image sensing element a smaller size, namely, ⅓ in. or ¼ in., of image sensing element is being used. In addition, a zoom lens to be used is required to be of a smaller size according to the small-sized image sensing element.

Also, in the photographic lens adapted to be used in the video camera, the distance from the last lens surface to the surface of the image sensing element, i.e., the back focal distance, must be made relatively long. Otherwise, dust or fine foreign particles on the last lens surface would cast their shadow on the image receiving surface, giving bad influence to the image.

However, if, as the design for the zoom lens that is adapted to be used with, for example, the ½ in. image sensor, is applied to one which is to be used with the ¼ in. image sensor, the size of that zoom lens is merely scaled down, the back focal distance gets shorter in proportion (to ½). Then, the shadow against the foreign particles or the like on the last lens surface is caused to appear on the image receiving surface, thus giving rise to a problem of lowering the image quality. For this reason, even the reduction of the size of the image sensor leads to a requirement that, as far as the zoom lens for the video camera is concerned, the back focal distance be made longer than a predetermined value.

In general, if the zoom lens of the rear focus type is employed, the bulk and size of the entire lens system is minimized and rapid focusing becomes possible.

On the other hand, however, the range of variation of aberrations with focusing is caused to increase. So, a problem arises in that it becomes very difficult to obtain a high optical performance throughout the entire range of distances of objects from an infinitely distant object to an object at the minimum distance, while still maintaining the minimization of the bulk and size of the entire lens system to be achieved. Particularly, with respect to a large relative aperture, high range zoom lens, the problem of maintaining good stability of high optical performance throughout the entire zooming range and throughout the entire focusing range becomes very serious.

SUMMARY OF THE INVENTION

The present invention, while employing the rear focus type, achieves an increase of the aperture ratio and an extension of the range of variation of the magnification. It is, therefore, an object of the invention to provide a zoom lens of the rear focus type which minimizes in the bulk and size of the entire lens system, while still permitting good stability of optical performance throughout the range of variation of the magnification from the wide-angle end to the telephoto end, i.e., the entire zooming range, and throughout the range of object distances from an infinitely distant object to a closest object, i.e., the entire focusing range, to be achieved and which has a desired certain back focal distance.

BRIEF DESCRIPTION OF THE DRAWINGS

FIGS. 5A–5C show graphs of the various aberrations of the numerical example 1 of the invention in the wideangle end.

FIGS. 6A–6C show graphs of the various aberrations of the numerical example 1 of the invention in an intermediate position.

FIGS. 7A–7C show graphs of the various aberrations of the numerical example 1 of the invention in the telephoto end.

FIGS. 8A–8C show graphs of the various aberrations of the numerical example 2 of the invention in the wideangle end.

FIGS. 9A–9C show graphs of the various aberrations of the numerical example 2 of the invention in an intermediate position.

FIGS. 10A–10C show graphs of the various aberrations of the numerical example 2 of the invention in the telephoto end.

FIGS. 11A–11C show graphs of the various aberrations of the numerical example 3 of the invention in the wideangle end.

FIGS. 12A–12C show graphs of the various aberrations of the numerical example 3 of the invention in an intermediate position.

FIGS. 13A–13C show graphs of the various aberrations of the numerical example 3 of the invention in the telephoto end.

FIGS. 17A–17C show graphs of the various aberrations of the numerical example 4 of the invention in the wideangle end.

FIGS. 18A–18C show graphs of the various aberrations of the numerical example 4 of the invention in an intermediate position.

FIGS. 21A–21C show graphs of the various aberrations of the numerical example 5 of the invention in an intermediate position.

FIGS. 22A–22C show graphs of the various aberrations of the numerical example 5 of the invention in the telephoto end.

FIGS. 25A–25C show graphs of the various aberrations of the numerical example 6 of the invention in the telephoto end.

In the diagram, the sectional views and the graphs of the various aberrations of the zoom lenses described above, L1 represents the first lens unit, L2 the second lens unit, L3 the third lens unit, L4 the fourth lens unit, SP the aperture stop, $\Delta S$ the sagittal image surface, and $\Delta M$ the meridional image surface.

DETAILED DESCRIPTION OF THE PREFERRED EMBODIMENTS

Figure 1:
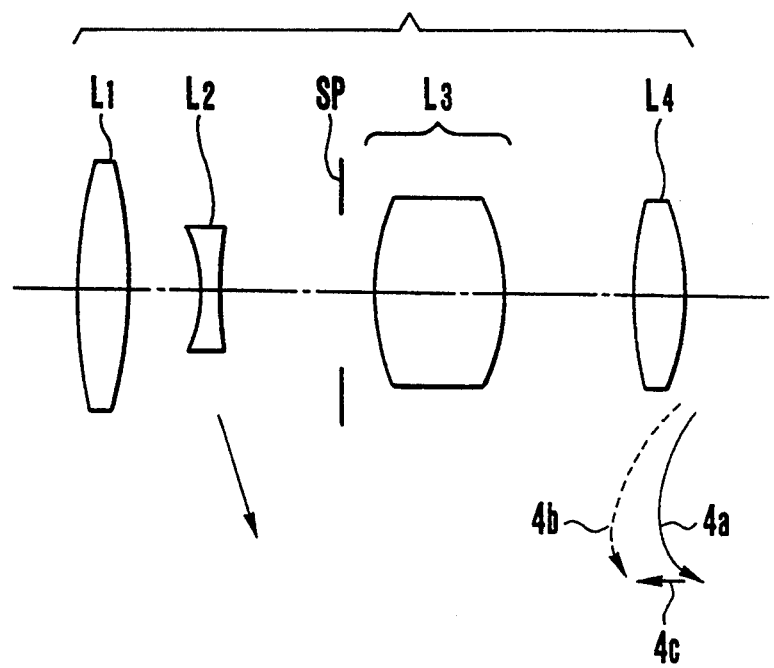
FIG. 1 is a diagram for explaining the paraxial refractive power arrangement of the invention.
Figure 2:
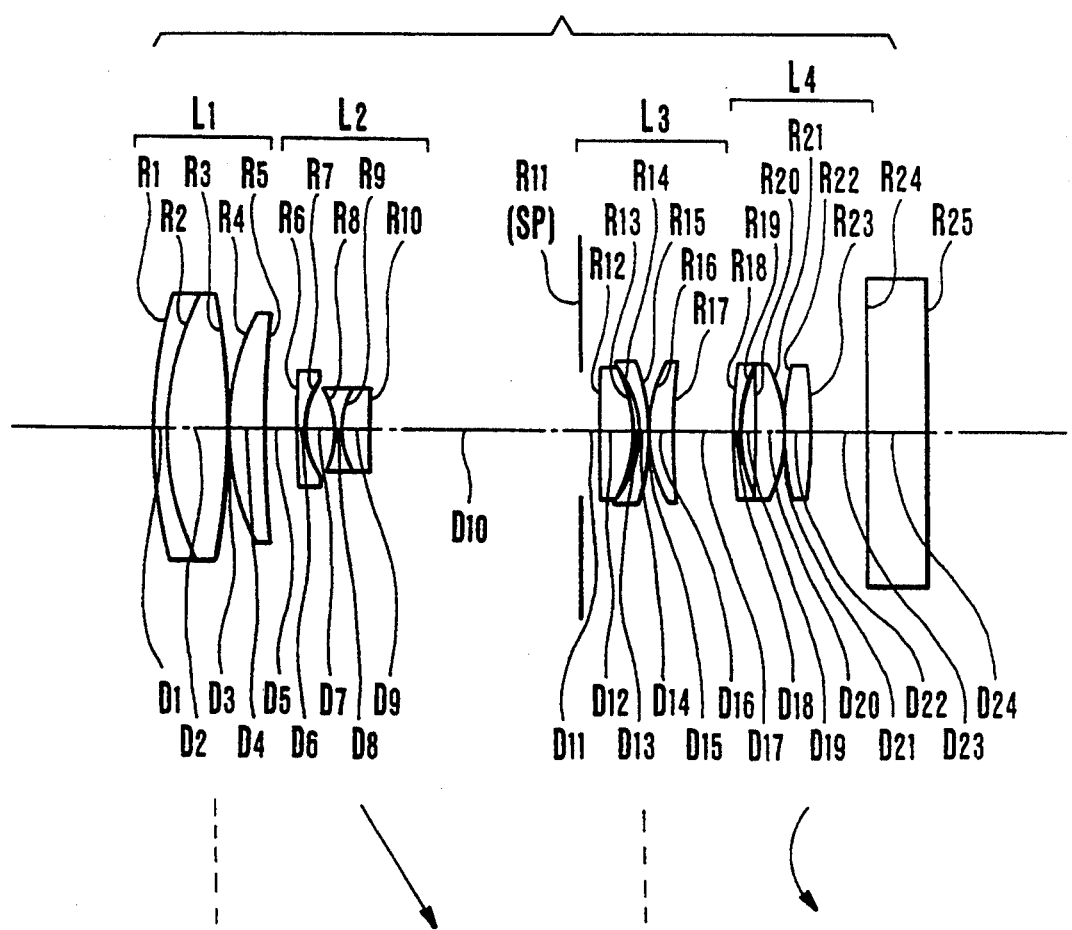
FIG. 2 is a longitudinal section view of a numerical example 1 of a zoom lens of the invention.
Figure 3:
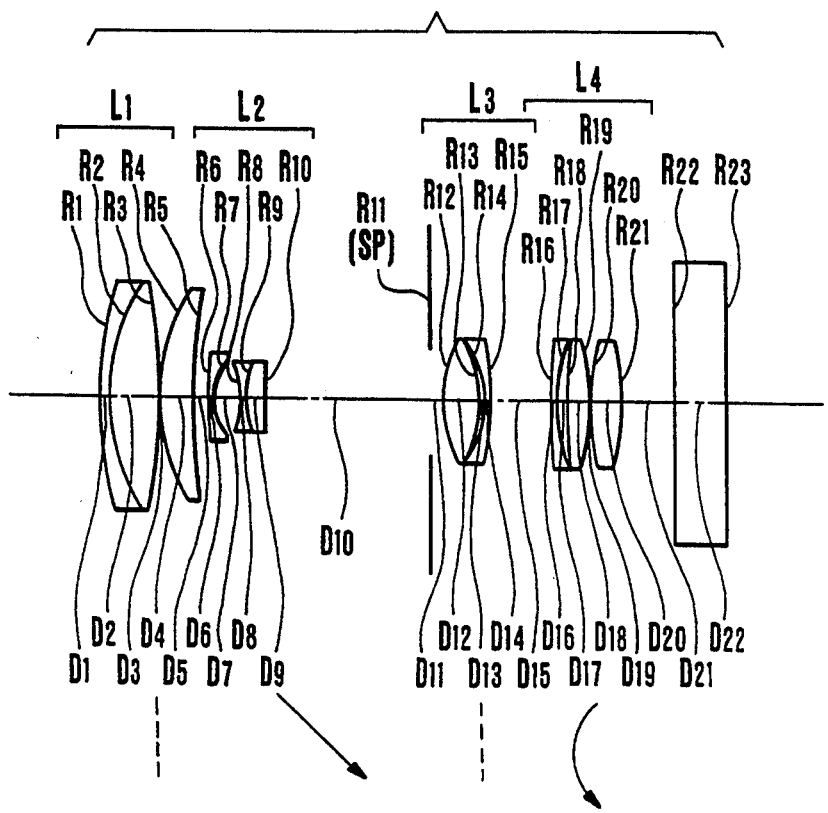
FIG. 3 is a longitudinal section view of a numerical example 2 of a zoom lens of the invention.
Figure 4:
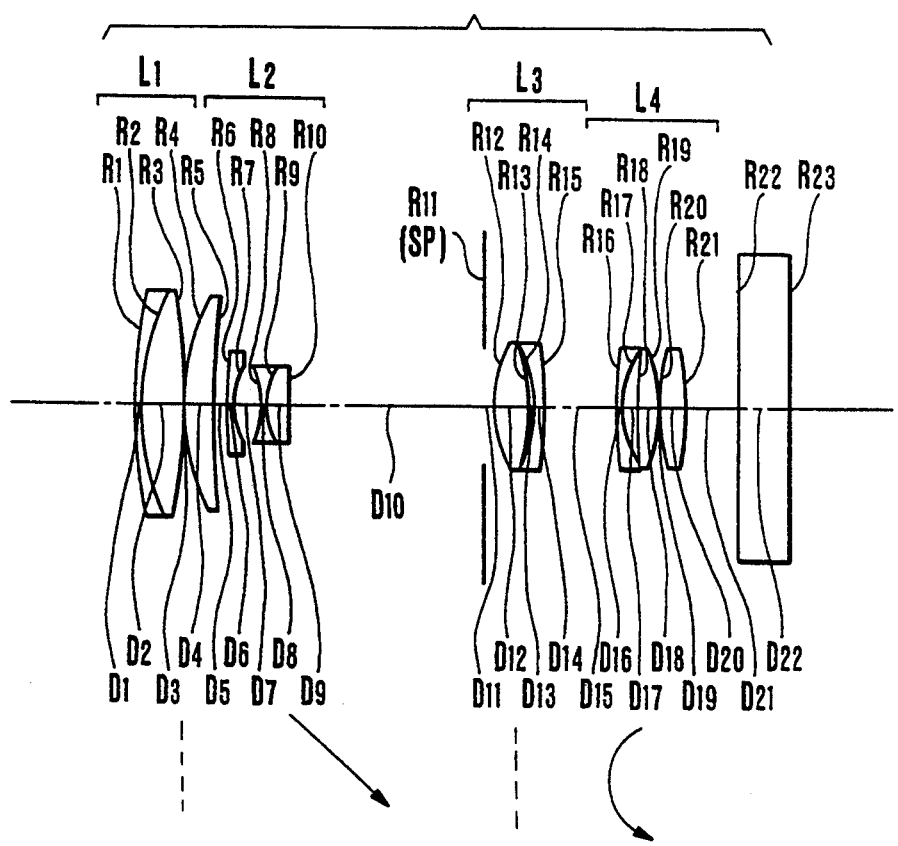
FIG. 4 is a longitudinal section view of a numerical example 3 of a zoom lens of the invention.
Figure 14:
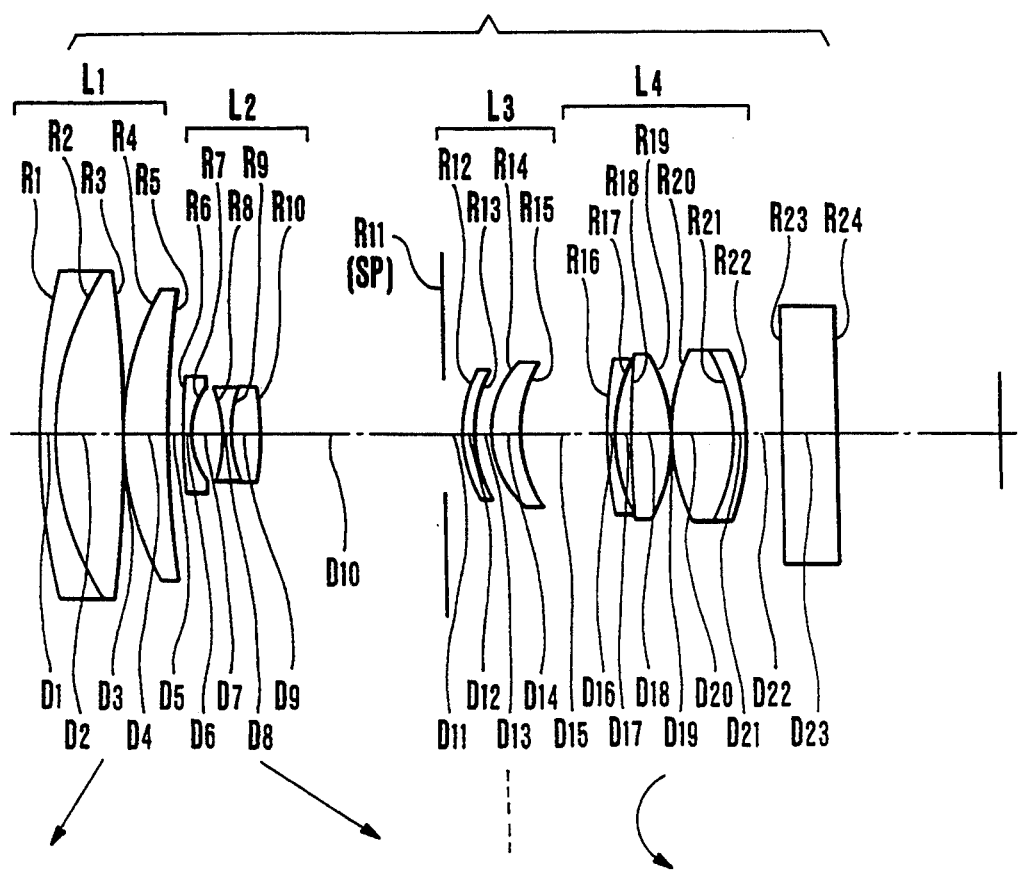
FIG. 14 is a longitudinal section view of a numerical example 4 of a zoom lens of the invention.
Figure 15:
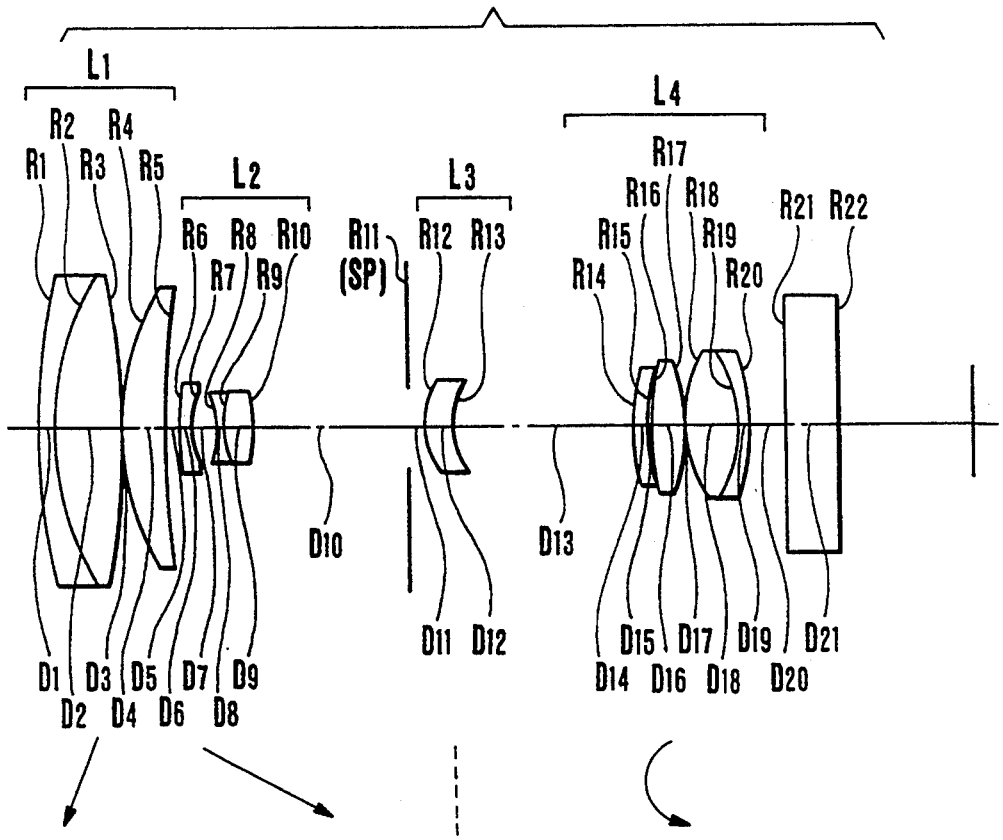
FIG. 15 is a longitudinal section view of a numerical example 5 of a zoom lens of the invention.
Figure 16:
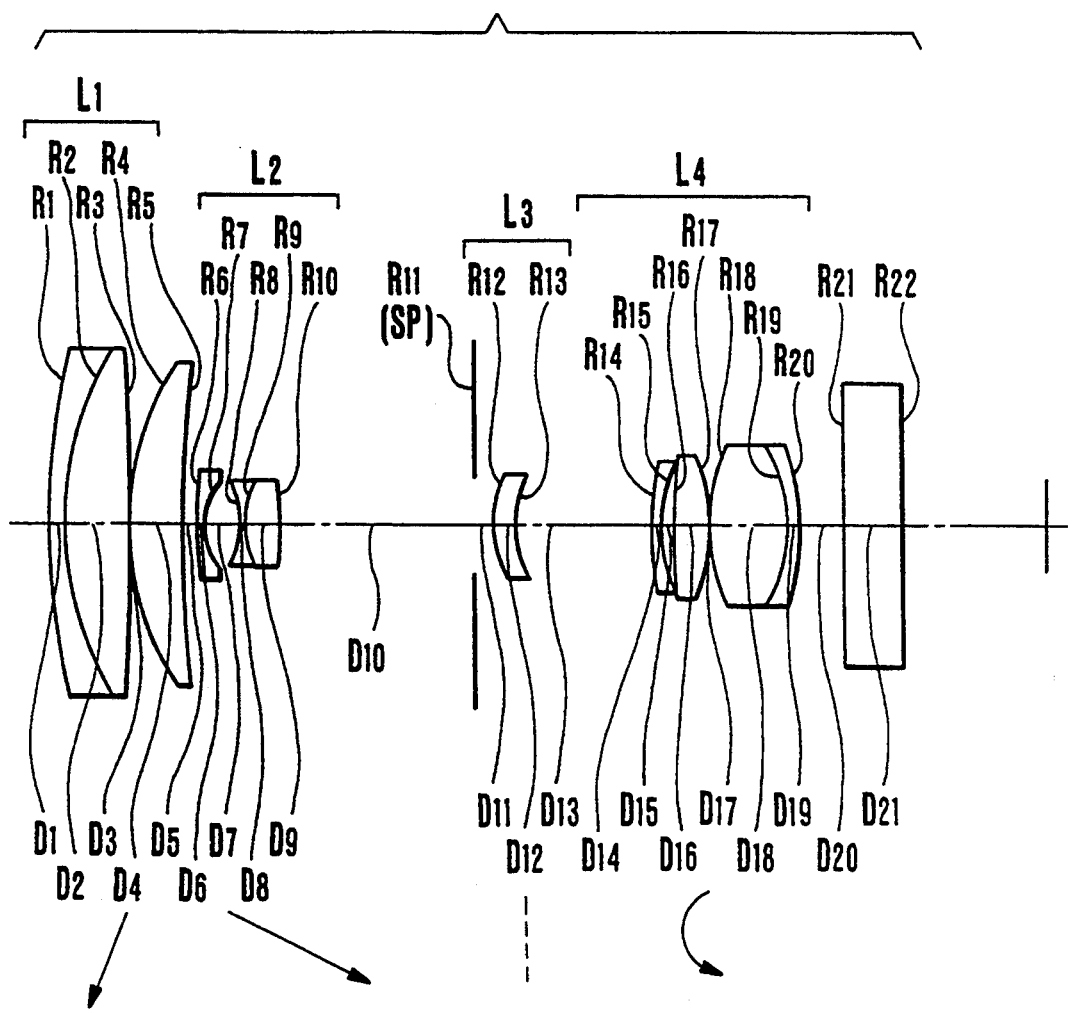
FIG. 16 is a longitudinal section view of a numerical example 6 of a zoom lens of the invention.
Figure 19A:
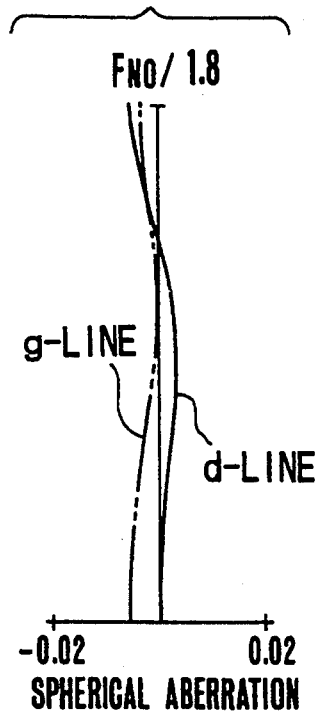
FIGS. 19A–19C show graphs of the various aberrations of the numerical example 4 of the invention in the telephoto end.
Figure 19B:
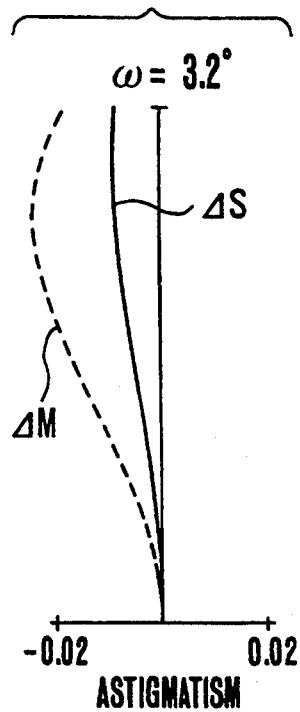
Figure 19C:
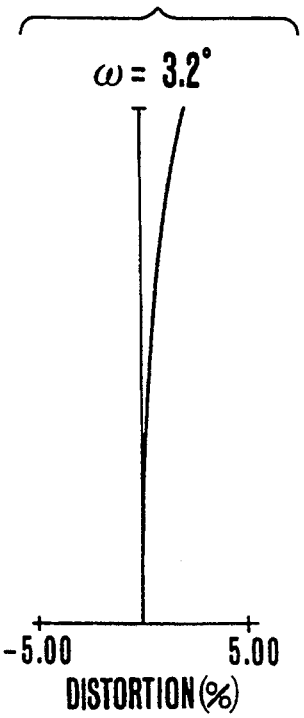
Figure 20A:
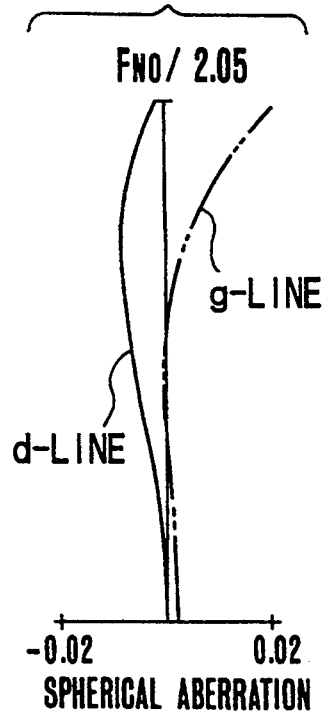
FIGS. 20A–20C show graphs of the various aberrations of the numerical example 5 of the invention in the wideangle end.
Figure 20B:
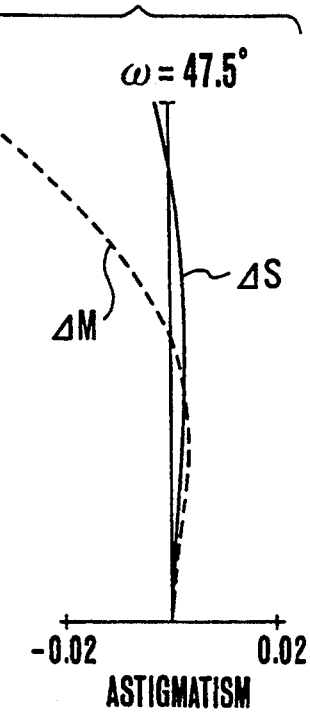
Figure 20C:
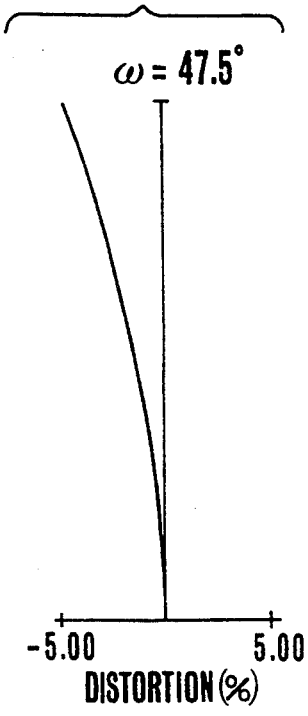
Figure 23A:
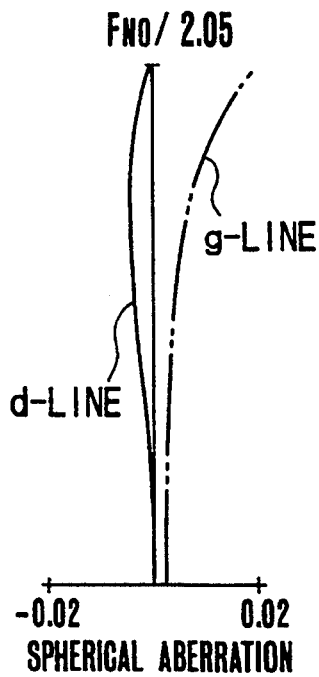
FIGS. 23A–23C show graphs of the various aberrations of the numerical example 6 of the invention in the wideangle end.
Figure 23B:
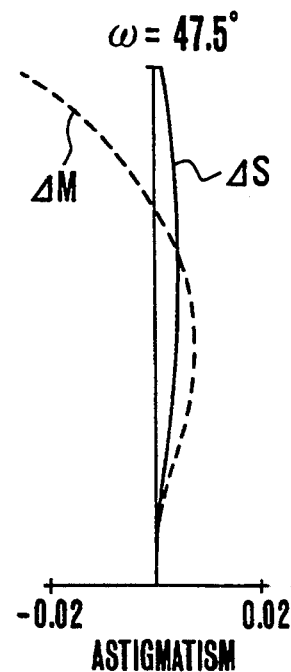
Figure 23C:
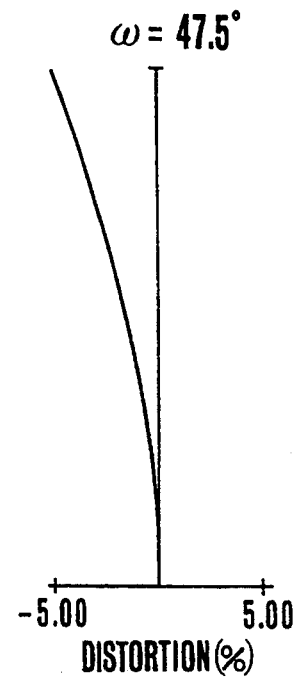
Figure 24A:
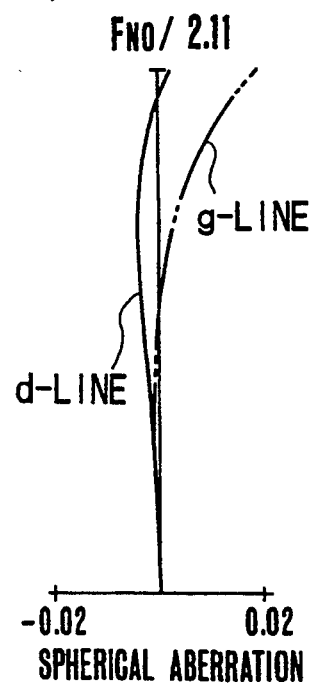
FIGS. 24A–24C show graphs of the various aberrations of the numerical example 6 of the invention in an intermediate position.
Figure 24B:
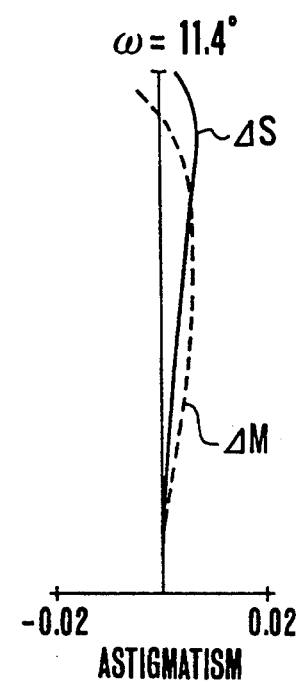
Figure 24C:
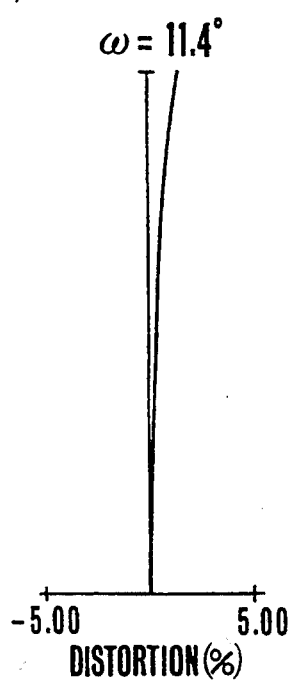

FIG. 1 is a schematic diagram illustrating the paraxial refractive power arrangement of an embodiment of a zoom lens of the rear focus type according to the invention. FIGS. 2 to 4 and FIGS. 14 to 16 are longitudinal section views of the numerical examples 1 to 6 of the zoom lenses to be described later.

In the drawings, L1 is a first lens unit of positive refractive power, L2 is a second lens unit of negative refractive power, L3 is a third lens unit of positive refractive power and L4 is a fourth lens unit of positive refractive power. SP is an aperture stop arranged in front of the third lens unit L3.

When zooming from the wide-angle end to the telephoto end, the second lens unit is moved to the image side as shown by an arrow, while the shift of an image plane with zooming is compensated for by moving the fourth lens unit.

Further, the fourth lens unit is axially moved to effect focusing. That is, the rear focus type is employed. So, the fourth lens unit moves along a locus shown by a solid line curve 4a in FIG. 1 for focusing on an infinitely distant object, or a dashed line curve 4b for focusing on a closest object, when compensating for the image shift during zooming from the wide-angle end to the telephoto end. Incidentally, the first and third lens units in this embodiment remain stationary during zooming and focusing.

In the present embodiment, the compensating provision for the shift of the image plane resulting from the variation of the focal length and the focusing provision are made in the fourth lens unit. Particularly, the locus of the movement with zooming from the wide-angle end to the telephoto end is made convex toward the object side as shown by the curves 4a and 4b in FIG. 1. These afford an efficient utilization of the space between the third and fourth lens units, thus advantageously achieving a shortening of the total length of the entire lens system.

In the present embodiment, focusing from an infinitely distant object to a closest object at, for example, the telephoto end is performed by moving the fourth lens unit forward as shown by a straight line arrow 4c in FIG. 1.

A feature of the present embodiment is that, as compared with the conventional 4-unit zoom lens which has the focusing provision made in the first lens unit, the effective diameter of the first lens unit is prevented from largely increasing, by employing the rear focus type in such a way as described above.

Another feature is that the aperture stop is positioned just before the third lens unit to lessen the variation of aberrations due to the movable lens units, and the separations between those of the lens units which lie ahead of the aperture stop are shortened to facilitate the shortening of the diameter of the front lens members.

Still other features are that, letting the composite focal length of the third and fourth lens units in the wide-angle end be denoted by f3,4, the shortest focal length of the entire lens system by FW, and the back focal distance in the wide-angle end by Fb, the following conditions are satisfied:

$$2.2 < |Fb/FW| \quad (1)$$

$$0.8 < |Fb/f3,4| < 1.1 \quad (2)$$

By setting forth the refractive powers for the lens units as specified above, a high range zoom lens is obtained in which the bulk and size of the entire lens system are minimized in such a manner that a predetermined value of the back focal distance is secured, while still permitting good stability of optical performance to be maintained throughout the entire zooming range and, further, throughout the entire focusing range.

The technical significance of each of the abovedescribed conditions is explained below.

The inequality of condition (1) is concerned with the ratio of the back focal distance to the shortest focal length of the entire lens system and has an aim chiefly to obtain a predetermined back focal distance with the reduction of the bulk and size of the entire lens system to a minimum. When the back focal distance is too short as exceeding the lower limit of the condition (1), the shadows against the foreign particles on the last lens surface become appreciable at the surface of the image sensor, thus lowering the image quality.

The inequalities of condition (2) are concerned with the ratio of the back focal distance to the composite focal length of the third and fourth lens units in the wide-angle end and have an aim chiefly to obtain a certain amount of the back focal distance in such a manner that the variation of aberrations is lessened. When the composite positive refractive power of the third and fourth lens units is too weak as exceeding the lower limit of the condition (2), the back focal distance is caused to shorten. As has been described above, therefore, the shadows of the foreign particles on the last lens surface become appreciable in the image. Thus a bad influence is given to the image quality. When the composite refractive power of the third and fourth lens units is too strong as exceeding the upper limit, particularly when the refractive power of the fourth lens unit is too strong, variation of the aberrations with zooming and focusing becomes objectionably large.

The zoom lens of the rear focus type according to the invention is achieved by satisfying the abovedescribed various conditions. To obtain a better optical performance throughout the entire zooming range and throughout the entire focusing range with the bulk and size of the entire lens system to the minimum, however, it is preferred to satisfy the following conditions i) to iii):

$$i) \quad 0.3 < |f2/\sqrt{FW \cdot FT}| < 0.4 \quad (3)$$

$$0.9 < |\beta 2T/\sqrt{z}| < 1.23 \quad (4)$$

where f2 is the focal length of the second lens unit, $\beta 2T$ is the image magnification of the second lens unit in the telephoto end, FT is the longest focal length of the entire lens system, and z is the zoom ratio.

The inequalities of condition (3) have an aim to fulfill the requirements of suppressing the variation of the aberrations with zooming and of advantageously shortening the total length of the entire lens system. When the negative refractive power of the second lens unit is too weak as exceeding the upper limit, the required total movement for a predetermined zoom ratio of the second lens unit has to be increased. In turn, the total length of the entire lens system becomes longer. When the negative refractive power of the second lens unit is too strong as exceeding the lower limit, the Petzval sum increases in the negative sense. So, the curvature of field becomes large and the coma becomes difficult to correct well. Also, the variation, too, of the aberrations with zooming increases objectionably.

When the absolute value of the magnifying power of the second lens unit in the telephoto end is too small as exceeding the lower limit of the condition (4), the required total movement for a predetermined zoom ratio of the second lens unit is caused to increase. In turn, the total length of the entire lens system becomes long. When the magnifying power is too large as exceeding the upper limit, the sensitivity on the telephoto side becomes large and the amount of accompanying movement of the fourth lens unit with zooming increases. Further, the back focal distance becomes short. So, it is no good.

$$ii) \quad 0.6 < e3W/\sqrt{FW \cdot FT} < 0.74 \quad (5)$$

where e3W is the interval between the principal points of the third and fourth lens units in the wide-angle end.

When the principal point interval is too short as exceeding the lower limit of the condition (5), as the fourth lens unit is used in focusing, the space in which the fourth lens unit can move becomes small. When the principal point interval is too long as exceeding the upper limit, it becomes difficult to secure the back focal distance at a predetermined value.

iii) The aforesaid third lens unit has at least one aspheric surface of such shape that the positive refractive power gets progressively weaker from the center of the area of the lens surface to the marginal zone.

Owing to this aspheric surface, the number of lens elements of the third lens unit is lessened to shorten the total length of the entire lens system, while still preserving the high optical performance throughout the entire zooming range.

Incidentally, in the numerical examples 2 and 3 to be described later, of the lens elements, a bi-convex lens is provided with the aspheric surface at the object side to thereby correct the various aberrations in good balance.

Next, numerical examples 1 to 3 of the invention are shown. In the numerical data for the examples 1 to 3, Ri is the i-th lens surface when counted from the object side, Di is the i-th lens thickness or air separation, and Ni and υi are respectively the refractive index and Abbe number of the glass of the i-th lens element.

R24 and R25 of the numerical example 1 and R22 and R23 of the numerical examples 2 and 3 denote face plates or like glass blocks.

The shape of the aspheric surface is expressed in coordinates with an X-axis in the axial direction and an H-axis in the direction perpendicular to the optical axis, the direction in which light advances being taken as positive, by the following equation:

$$X = \frac{(1/R) H^2}{1 + \sqrt{1 - (H/R)^2}} + AH^2 + BH^4 + CH^6 + DH^8$$

where R is the radius of the osculating sphere and A, B, C and D are the aspheric coefficients.

The values of the factors in the conditions for the numerical examples 1 to 3 are listed in Table-1.

Numerical Example 1: (FIGS. 2, 5A-5C, 6A-6C, and 7A-7C)
F = 1-7.6 FNO = 1:1.65-2.3 2ω = 48.8°-6.8°

| | | | |
|---|---|---|---|
| R1 = 7.869 | D1 = 0.138 | N1 = 1.80518 | ν1 = 25.4 |
| R2 = 3.741 | D2 = 0.759 | N2 = 1.51633 | ν2 = 64.1 |
| R3 = −12.767 | D3 = 0.037 | | |
| R4 = 3.112 | D4 = 0.463 | N3 = 1.60311 | ν3 = 60.7 |
| R5 = 11.504 | D5 = Variable | | |
| R6 = 9.688 | D6 = 0.111 | N4 = 1.69680 | ν4 = 55.5 |
| R7 = 1.091 | D7 = 0.412 | | |
| R8 = −1.482 | D8 = 0.111 | N5 = 1.69680 | ν5 = 55.5 |
| R9 = 1.567 | D9 = 0.333 | N6 = 1.84666 | ν6 = 23.9 |
| R10 = −13.469 | D10 = Variable | | |
| R11 = Stop | D11 = 0.208 | | |
| R12 = 27.330 | D12 = 0.463 | N7 = 1.63854 | ν7 = 55.4 |
| R13 = −2.140 | D13 = 0.084 | | |
| R14 = −1.586 | D14 = 0.111 | N8 = 1.80518 | ν8 = 25.4 |
| R15 = −2.890 | D15 = 0.027 | | |
| R16 = 2.389 | D16 = 0.240 | N9 = 1.51633 | ν9 = 64.1 |
| R17 = 8.012 | D17 = Variable | | |
| R18 = 5.617 | D18 = 0.111 | N10 = 1.84666 | ν10 = 23.9 |
| R19 = 2.449 | D19 = 0.148 | | |
| R20 = 14.250 | D20 = 0.407 | N11 = 1.60311 | ν11 = 60.7 |
| R21 = −2.690 | D21 = 0.027 | | |
| R22 = 2.808 | D22 = 0.370 | N12 = 1.51633 | ν12 = 64.1 |
| R23 = −11.298 | D23 = 0.740 | | |
| R24 = ∞ | D24 = 0.740 | N13 = 1.51633 | ν13 = 64.1 |
| R25 = ∞ | | | |

| Variable Separation | Focal Length | | |
|---|---|---|---|
| | 1.00 | 4.24 | 7.60 |
| D5 | 0.26 | 2.21 | 2.77 |
| D10 | 2.67 | 0.72 | 0.17 |
| D17 | 0.82 | 0.42 | 1.00 |

Numerical Example 2: (FIGS. 3, 8A-8C, 9A-9C, and 10A-10C)
F = 1-7.6 FNO = 1:1.65-2.43 2ω = 48.8°-6.8°

| | | | |
|---|---|---|---|
| R1 = 6.511 | D1 = 0.138 | N1 = 1.80518 | ν1 = 25.4 |
| R2 = 3.126 | D2 = 0.722 | N2 = 1.51633 | ν2 = 64.1 |
| R3 = −12.832 | D3 = 0.037 | | |
| R4 = 2.772 | D4 = 0.490 | N3 = 1.60311 | ν3 = 60.7 |
| R5 = 12.291 | D5 = Variable | | |
| R6 = 10.212 | D6 = 0.092 | N4 = 1.69680 | ν4 = 55.5 |
| R7 = 0.920 | D7 = 0.353 | | |
| R8 = −1.259 | D8 = 0.092 | N5 = 1.69680 | ν5 = 55.5 |
| R9 = 1.242 | D9 = 0.259 | N6 = 1.84666 | ν6 = 23.9 |
| R10 = −9.426 | D10 = Variable | | |
| R11 = Stop | D11 = 0.208 | | |
| R12 = aspheric surface | D12 = 0.428 | N7 = 1.60311 | ν7 = 60.7 |
| R13 = −2.648 | D13 = 0.055 | | |
| R14 = −2.064 | D14 = 0.102 | N8 = 1.80518 | ν8 = 25.4 |
| R15 = −4.377 | D15 = Variable | | |
| R16 = 8.928 | D16 = 0.111 | N9 = 1.84666 | ν9 = 23.9 |
| R17 = 2.438 | D17 = 0.148 | | |
| R18 = 20.913 | D18 = 0.287 | N10 = 1.60311 | ν10 = 60.7 |
| R19 = −2.995 | D19 = 0.027 | | |
| R20 = 2.728 | D20 = 0.444 | N11 = 1.51633 | ν11 = 64.1 |
| R21 = −3.300 | D21 = 0.740 | | |
| R22 = ∞ | D22 = 0.740 | N12 = 1.51633 | ν12 = 64.1 |
| R23 = ∞ | | | |

| Variable Separation | Focal Length | | |
|---|---|---|---|
| | 1.00 | 4.10 | 7.60 |
| D5 | 0.21 | 1.84 | 2.35 |
| D10 | 2.37 | 0.74 | 0.23 |
| D15 | 0.87 | 0.40 | 1.08 |

Values of the Aspheric Coefficients:

R = 2.322   A = 0   B = −2.196 × 10⁻²   C = 1.238 × 10⁻²
D = −7.496 × 10⁻³

Numerical Example 3: (FIGS. 4, 11A-11C, 12A-12C, and 13A-13C)
F = 1-7.6 FNO = 1:1.65-2.43 2ω = 48.8°-6.8°

| | | | |
|---|---|---|---|
| R1 = 7.446 | D1 = 0.138 | N1 = 1.80518 | ν1 = 25.4 |
| R2 = 3.672 | D2 = 0.574 | N2 = 1.51633 | ν2 = 64.1 |
| R3 = −13.780 | D3 = 0.037 | | |
| R4 = 3.219 | D4 = 0.416 | N3 = 1.60311 | ν3 = 60.7 |
| R5 = 11.755 | D5 = Variable | | |
| R6 = 4.976 | D6 = 0.111 | N4 = 1.69680 | ν4 = 55.5 |
| R7 = 1.101 | D7 = 0.423 | | |
| R8 = −1.492 | D8 = 0.111 | N5 = 1.69680 | ν5 = 55.5 |
| R9 = 1.442 | D9 = 0.259 | N6 = 1.84666 | ν6 = 23.9 |
| R10 = 129.653 | D10 = Variable | | |
| R11 = Stop | D11 = 0.200 | | |
| R12 = aspheric surface | D12 = 0.463 | N7 = 1.60311 | ν7 = 60.7 |
| R13 = −3.189 | D13 = 0.064 | | |
| R14 = −2.292 | D14 = 0.111 | N8 = 1.80518 | ν8 = 25.4 |
| R15 = −6.099 | D15 = Variable | | |
| R16 = 4.707 | D16 = 0.120 | N9 = 1.84666 | ν9 = 23.9 |
| R17 = 2.436 | D17 = 0.168 | | |
| R18 = 17602.765 | D18 = 0.287 | N10 = 1.60311 | ν10 = 60.7 |
| R19 = −2.688 | D19 = 0.027 | | |
| R20 = 2.698 | D20 = 0.351 | N11 = 1.51633 | ν11 = 64.1 |
| R21 = −5.820 | D21 = 0.740 | | |
| R22 = ∞ | D22 = 0.740 | N12 = 1.51633 | ν12 = 64.1 |
| R23 = ∞ | | | |

| Variable Separation | Focal Length | | |
|---|---|---|---|
| | 1.00 | 4.40 | 7.60 |
| D5 | 0.18 | 2.21 | 2.78 |
| D10 | 2.80 | 0.78 | 0.21 |
| D15 | 0.97 | 0.44 | 0.97 |

Values of the Aspheric Coefficients:

R = 2.250   A = 0
B = −1.715 × 10⁻²   C = 3.506 × 10⁻³
D = 3.715 × 10⁻⁵

TABLE 1

| | Numerical Example | | |
|---|---|---|---|
| Condition | 1 | 2 | 3 |
| (1) $|Fb/FW|$ | 2.30 | 2.30 | 2.44 |
| (2) $|Fb/f_{3,4}|$ | 0.99 | 0.98 | 1.04 |
| (3) $|f_2/\sqrt{FW \cdot FT}|$ | 0.39 | 0.34 | 0.39 |
| (4) $|\beta\,2T/\sqrt{z}|$ | 1.20 | 1.22 | 1.00 |
| (5) $e_{3W}/\sqrt{FW \cdot FT}$ | 0.65 | 0.70 | 0.73 |

Next explanation is given to another embodiment of the zoom lens as considered from another standpoint to be suited when in application to the ¼ in. image sensor.

The zoom lens of the rear focus type of the invention comprises, from front to rear, a first lens unit of positive refractive power, a second lens unit of negative refractive power, a stop, a third lens unit of positive refractive power and a fourth lens unit of positive refractive power, the first lens unit being moved toward the object side and the second lens unit being moved toward the image side when zooming from the wideangle end to the telephoto end, while the fourth lens unit is simultaneously moved to compensate for the image shift resulting from the variation of the image magnification, wherein the fourth lens unit is moved toward the object side to effect focusing from an infinitely distant object to a closest object, and, letting the focal length of the i-th lens unit be donated by fi, the shortest focal length of the entire lens system by FW, the longest focal length of the entire lens system by FT, the interval between the principal points of the third and fourth lens units in the telephoto end with an infinitely distant object in focus by e3T, and the paraxial back focal distance in the telephoto end by FBT, the following conditions are satisfied:

$$0.32 < FBT/FT < 0.50 \ldots (6)$$
$$2 < f3/f4 < 9 \ldots (7)$$
$$2 < e3T/FW < 5 \ldots (8)$$

The technical significance of each of the above-described conditions is explained below.

The inequalities of condition (6) are concerned with the ratio of the back focal distance to the longest focal length of the entire lens system and have an aim chiefly to obtain a predetermined back focal distance in such a manner that the bulk and size of the entire lens system are reduced. When the back focal distance is too short as exceeding the lower limit of the condition (6), the shadows against the foreign particles on the last lens surface become appreciable on the surface of the image sensor, lowering the image quality. When the back focal distance is too long as exceeding the upper limit, as so much unnecessary space arises between the lens system and the image sensor, the size of the entire lens system is caused to increase objectionably.

The inequalities of condition (7) are concerned with the ratio of the focal lengths of the third and fourth lens units and have an aim chiefly to effectively obtain a certain value of the back focal distance. When the positive refractive power of the third lens unit is too strong as exceeding the lower limit of the condition (7), the back focal distance becomes too short and the refractive power of the fourth lens unit becomes too weak as compared with the third lens unit, causing the amount of focusing movement of the fourth lens unit to increase largely. Thus, the size of the lens system as a whole comes to increase. When the refractive power of the third lens unit is too weak as exceeding the upper limit, the back focal distance becomes too long and the refractive power of the fourth lens unit comes to be strong as compared with the third lens unit. Thus, the variation of aberrations with focusing increases objectionably.

The inequalities of condition (8) are concerned with the interval between the principal points of the third and fourth lens units in the telephoto end and have an aim chiefly to preserve the optical performance on the telephoto side. When the principal point interval is too short as exceeding the lower limit of the condition (8), the available range of movement of the fourth lens unit during focusing becomes too narrow. So, it becomes difficult to focus on a closest object. When the principal point interval is too long as exceeding the upper limit, an unnecessary space arises, increasing the size of the entire lens system objectionably.

The zoom lens of the rear focus type according to the invention is achieved by satisfying the abovedescribed various conditions. However, to facilitate fulfillment of the requirements of reducing the bulk and size of the entire lens system and of improving the optical performance throughout the entire zooming range and throughout the entire focusing range, it is preferred to satisfy the following additional conditions iv) to vii):

iv)

$$0.9 < M1/M2 < 1.2 \qquad (9)$$

where M1 and M2 are the amounts of movement during zooming of the first and second lens units, respectively.

When the movement of the second lens unit is far larger than the movement of the first lens unit as exceeding the lower limit of the condition (9), the size of the entire lens system comes to be large. Conversely when the movement of the first lens unit is far larger as exceeding the upper limit, the structure of a mechanism for operatively connecting the first and second lens units becomes complicated. In addition, the locus of movement of the fourth lens unit for compensating for the image shift with zooming becomes so steep that the difficulty of drive control by the actuator increases objectionably.

$$v) \quad 1 < |\beta 2T/\sqrt{z}| < 2 \qquad (10)$$

where $\beta 2T$ is the lateral magnification of the second lens unit in the telephoto end and z is the zoom ratio of the entire lens system.

When the lateral magnification $\beta 2T$ is too large as exceeding the upper limit of the condition (10), the locus of movement of the fourth lens unit becomes steep likewise as described in connection with the condition (9). When the lower limit is exceeded, the locus of movement of the fourth lens unit swells largely toward the object side in the intermediate zooming positions. Therefore, the separation between the third and fourth lens units has to be increased. As a result, the size of the entire lens system is increased objectionably.

vi)

$$1.32 < |f2/FW| < 1.65 \qquad (11)$$

where f2 is the focal length of the second lens unit.

When the refractive power of the second lens unit is too weak as exceeding the upper limit of the condition (11), the required total zooming movement for a predetermined zoom ratio of the second lens unit has to be increased. Thus, the total length of the entire lens system becomes long. When the refractive power of the second lens unit is too strong as exceeding the lower limit, this leads to an increase in the refractive powers of the other lens units. From the standpoint of the aberration correction, the number of lens elements of each unit has to be increased. So, in effect, the total length of the entire lens system becomes long. Also, the locus of movement of the fourth lens unit for compensating for the image shift with zooming becomes so steep that the difficulty of driving control by the actuator increases objectionably.

vii) The third lens unit has at least one meniscus-shaped positive lens having an aspheric surface convex toward the object side.

In the present embodiment, the second lens unit of negative refractive power produces a diverging light beam, which passes through the third lens unit without being much refracted because the positive power of the third lens unit is relatively weak. With this light beam, the various aberrations are corrected in good balance by the aspheric meniscus lens convex toward the object side.

Incidentally, in numerical examples to be described later, the third lens unit is constructed with either a negative lens of meniscus shape convex toward the object side and a positive lens of meniscus shape convex toward the object side and having an aspheric surface, totaling two lenses, or a positive lens of meniscus shape convex toward the object side and having an aspheric surface, totaling only one lens.

Next, numerical Examples 4 to 6 of the invention are shown. In the numerical data of the examples 4 to 6, Ri is the radius of curvature of the i-th lens surface when counted from the object side, Di is the i-th lens thickness or air separation and Ni and $\nu i$ are respectively the refractive index and Abbe number of the glass of the i-th lens element.

R23 and R24 of the numerical example 4 and R21 and R22 of the numerical examples 5 and 6 denote face plates or like glass blocks.

The shape of the aspheric surface is expressed in coordinates with an X-axis in the axial direction and an H-axis in the direction perpendicular to the optical axis, the direction in which light advances being taken as positive, by the following equation:

$$X = \frac{(1/R) H^2}{1 + \sqrt{1 - (H/R)^2}} + AH^2 + BH^4 + CH^6 + DH^8 + EH^{10}$$

where R is the radius of the osculating sphere and A, B, C, D and E are the aspheric coefficients.

Also, the values of the factors in the conditions (6) to (11) for the numerical examples 4 to 6 are listed in Table-2.

Numerical Example 4: (FIGS. 14, 17A–17C, 18A–18C, and 19A–19C)
F = 1–2.58–7.60 FNO = 1:1.45–1.52–1.80 $2\omega$ = 94.9°–18.7°–6.4°

| R1 = 10.079 | D1 = 0.226 | N1 = 1.80518 | $\nu 1$ = 25.4 |
| R2 = 4.786 | D2 = 0.905 | N2 = 1.51633 | $\nu 2$ = 64.1 |
| R3 = −33.682 | D3 = 0.037 | | |
| R4 = 4.638 | D4 = 0.641 | N3 = 1.65844 | $\nu 3$ = 50.9 |
| R5 = 20.641 | D5 = Variable | | |
| R6 = 9.579 | D6 = 0.132 | N4 = 1.80610 | $\nu 4$ = 40.9 |
| R7 = 1.124 | D7 = 0.455 | | |
| R8 = −1.667 | D8 = 0.132 | N5 = 1.51742 | $\nu 5$ = 52.4 |
| R9 = 1.667 | D9 = 0.396 | N6 = 1.80518 | $\nu 6$ = 25.4 |
| R10 = −8.681 | D10 = Variable | | |
| R11 = Stop | D11 = 0.283 | | |
| R12 = 2.156 | D12 = 0.132 | N7 = 1.80518 | $\nu 7$ = 25.4 |
| R13 = 1.626 | D13 = 0.247 | | |
| R14 = aspheric surface | D14 = 0.415 | N8 = 1.58313 | $\nu 8$ = 59.4 |
| R15 = 2.288 | D15 = Variable | | |
| R16 = 7.570 | D16 = 0.132 | N9 = 1.84666 | $\nu 9$ = 23.9 |
| R17 = 2.883 | D17 = 0.185 | | |
| R18 = 14.840 | D18 = 0.603 | N10 = 1.51633 | $\nu 10$ = 64.1 |
| R19 = −2.613 | D19 = 0.028 | | |
| R20 = 3.064 | D20 = 0.830 | N11 = 1.60311 | $\nu 11$ = 60.7 |
| R21 = −2.766 | D21 = 0.132 | N12 = 1.84666 | $\nu 12$ = 23.9 |
| R22 = −3.696 | D22 = 0.566 | | |

Numerical Example 4: (FIGS. 14, 17A–17C, 18A–18C, and 19A–19C)
F = 1–2.58–7.60 FNO = 1:1.45–1.52–1.80 $2\omega$ = 94.9°–18.7°–6.4°

| R23 = ∞ | D23 = 0.754 | N13 = 1.51633 | $\nu 13$ = 64.1 |
| R24 = ∞ | | | |

R14: Aspheric Surface

| $R_0$ = 1.4703 | B = −3.5070 × $10^{-2}$ |
| C = 5.3129 × $10^{-3}$ | D = −8.9712 × $10^{-3}$ |

| Variable Separation | Focal Length | | |
| --- | --- | --- | --- |
| | 1.00 | 2.58 | 7.60 |
| D5 | 0.21 | 2.69 | 4.35 |
| D10 | 2.65 | 1.30 | 0.40 |
| D15 | 1.17 | 1.01 | 1.61 |

Numerical Example 5: (FIGS. 15, 20A–20C, 21A–21C and 22A–22C)
F = 1–2.58–7.60 FNO = 1:2.05–2.14–2.75 $2\omega$ = 94.9°–18.7°–6.4°

| R1 = 11.329 | D1 = 0.207 | N1 = 1.80518 | $\nu 1$ = 25.4 |
| R2 = 4.462 | D2 = 0.905 | N2 = 1.51633 | $\nu 2$ = 64.1 |
| R3 = −19.331 | D3 = 0.037 | | |
| R4 = 4.131 | D4 = 0.641 | N3 = 1.65844 | $\nu 3$ = 50.9 |
| R5 = 18.940 | D5 = Variable | | |
| R6 = 7.189 | D6 = 0.132 | N4 = 1.80610 | $\nu 4$ = 40.9 |
| R7 = 0.905 | D7 = 0.380 | | |
| R8 = −1.352 | D8 = 0.132 | N5 = 1.51742 | $\nu 5$ = 52.4 |
| R9 = 1.352 | D9 = 0.396 | N6 = 1.80518 | $\nu 6$ = 25.4 |
| R10 = −6.198 | D10 = Variable | | |
| R11 = Stop | D11 = 0.283 | | |
| R12 = aspheric surface | D12 = 0.377 | N7 = 1.58313 | $\nu 7$ = 59.4 |
| R13 = 1.851 | D13 = Variable | | |
| R14 = 5.722 | D14 = 0.132 | N8 = 1.84666 | $\nu 8$ = 23.9 |
| R15 = 2.771 | D15 = 0.130 | | |
| R16 = 18.607 | D16 = 0.396 | N9 = 1.51633 | $\nu 9$ = 64.1 |
| R17 = −3.162 | D17 = 0.028 | | |
| R18 = 2.600 | D18 = 0.773 | N10 = 1.60311 | $\nu 10$ = 60.7 |
| R19 = −2.015 | D19 = 0.132 | N11 = 1.84666 | $\nu 11$ = 23.9 |
| R20 = −3.283 | D20 = 0.566 | | |
| R21 = ∞ | D21 = 0.754 | N12 = 1.51633 | $\nu 12$ = 64.1 |
| R22 = ∞ | | | |

R12: Aspheric Surface

| $R_0$ = 1.5581 | B = −2.8641 × $10^{-2}$ |
| $C_{11}$ = −7.5290 × $10^{-3}$ | D = 2.5511 × $10^{-3}$ |

| Variable Separation | Focal Length | | |
| --- | --- | --- | --- |
| | 1.00 | 2.58 | 7.60 |
| D5 | 0.20 | 2.50 | 4.04 |
| D10 | 2.25 | 1.13 | 0.39 |
| D13 | 1.71 | 1.50 | 2.15 |

Numerical Example 6: (FIGS. 16, 23A–23C, 24A–24C, and 25A–25C)
F = 1–2.11–7.60 FNO = 1:2.05–2.11–2.17 $2\omega$ = 94.9°–22.8°–6.4°

| R1 = 10.092 | D1 = 0.207 | N1 = 1.80518 | $\nu 1$ = 25.4 |
| R2 = 4.425 | D2 = 0.867 | N2 = 1.51633 | $\nu 2$ = 64.1 |
| R3 = −33.016 | D3 = 0.037 | | |
| R4 = 4.324 | D4 = 0.660 | N3 = 1.65844 | $\nu 3$ = 50.9 |
| R5 = 23.297 | D5 = Variable | | |
| R6 = 7.913 | D6 = 0.132 | N4 = 1.80610 | $\nu 4$ = 40.9 |
| R7 = 0.979 | D7 = 0.395 | | |
| R8 = −1.450 | D8 = 0.132 | N5 = 1.51742 | $\nu 5$ = 52.4 |
| R9 = 1.450 | D9 = 0.358 | N6 = 1.80518 | $\nu 6$ = 25.4 |
| R10 = −7.792 | D10 = Variable | | |
| R11 = Stop | D11 = 0.283 | | |
| R12 = 1.568 | D12 = 0.283 | N7 = 1.58313 | $\nu 7$ = 59.4 |
| R13 = 2.070 | D13 = Variable | | |
| R14 = 9.263 | D14 = 0.132 | N8 = 1.84666 | $\nu 8$ = 23.9 |
| R15 = 2.830 | D15 = 0.129 | | |
| R16 = aspheric surface | D16 = 0.434 | N9 = 1.51633 | $\nu 9$ = 64.1 |
| R17 = −2.768 | D17 = 0.028 | | |
| R18 = 2.680 | D18 = 0.924 | N10 = 1.60311 | $\nu 10$ = 60.7 |
| R19 = −2.361 | D19 = 0.132 | N11 = 1.84666 | $\nu 11$ = 23.9 |
| R20 = −3.437 | D20 = 0.566 | | |

-continued

Numerical Example 6: (FIGS. 16, 23A–23C, 24A–24C, and 25A–25C)
F = 1–2.11–7.60 FNO = 1:2.05–2.11–2.17 2ω = 94.9°–22.8°–6.4°

| R21 = ∞ | D21 = 0.754 | D12 = 1.51633 | ν12 = 64.1 |
|---|---|---|---|
| R22 = ∞ | | | |

| R16: Aspheric Surface | |
|---|---|
| $R_0 = 20.3984$ | $B = -3.3497 \times 10^{-2}$ |
| $C = -2.1297 \times 10^{-3}$ | $D = -2.4996 \times 10^{-3}$ |

| Variable Separation | Focal Length | | |
|---|---|---|---|
| | 1.00 | 2.11 | 7.60 |
| D5 | 0.14 | 2.12 | 4.09 |
| D10 | 2.54 | 1.56 | 0.58 |
| D13 | 1.68 | 1.49 | 2.06 |

TABLE 2

| Condition | Numerical Example | | |
|---|---|---|---|
| | 4 | 5 | 6 |
| (6) FBT/FT | 0.335 | 0.335 | 0.335 |
| (7) f3/f4 | 7.788 | 4.044 | 3.579 |
| (8) e3T/FW | 4.077 | 3.946 | 3.566 |
| (9) M1/M2 | 0.838 | 1.067 | 1.009 |
| (10) $\|\beta 2T/\sqrt{z}\|$ | 1.788 | 1.288 | 1.199 |
| (11) $\|f2/FW\|$ | 1.547 | 1.320 | 1.358 |

According to the invention, for the four lens units, their refractive powers are set forth, for the first, second and fourth lens units, the moving conditions in zooming are set forth, and for the third and fourth lens units, the refractive power ratio, among others, are set forth, as has been described above. Along with these, the lens configuration that the fourth lens unit is moved during focusing is employed in order that a predetermined back focal distance is secured despite the reduction of the bulk and size of the entire lens system. This makes it possible to obtain a zoom lens of the rear focus type which has, despite the increase of the zoom ratio to 8 or thereabout, to achieve a good aberration correction throughout the entire extended zooming range, and, during focusing, varies the aberrations to lesser extent for a high optical performance at an increased aperture ratio to 1.4–2.0 in F-number.

What is claimed is:

1. A zoom lens of the rear focus type comprising: from front to rear, a first lens unit of positive refractive power, a second lens unit of negative refractive power, a third lens unit of positive refractive power and a fourth lens unit of positive refractive power, zooming from a wide-angle end to a telephoto end being performed by moving said first lens unit toward an object side and said second lens unit toward an image side, while shift of an image plane resulting from the zooming is simultaneously compensated for by moving said fourth lens unit, and focusing from an infinitely distant object to a closest object being performed by moving said fourth lens unit toward the object side, wherein, letting the focal length of the i-th lens unit be denoted by fi, the shortest focal length of the entire lens system by FW, the longest focal length of the entire lens system by FT, an interval between principal points of said third and fourth lens units in the telephoto end when focusing on an infinitely distant object by e3T, and a paraxial back focal distance in the telephoto end by FBT, the following conditions are satisfied:

$$0.32 < FBT/FT < 0.50$$

$$2 < f3/f4 < 9$$

$$2 < e3T/FW < 5$$

2. A zoom lens of the rear focus type according to claim 1, satisfying the following condition:

$$0.9 < M1/M2 < 1.2$$

where M1 and M2 are the amounts of movement during zooming of said first and second lens units, respectively.

3. A zoom lens of the rear focus type according to claim 1, satisfying the following condition:

$$1 < |\beta 2T/\sqrt{z}| < 2$$

where $\beta 2T$ is a lateral magnification of said second lens unit in the telephoto end, and z is a zoom ratio of the entire lens system.

4. A zoom lens of the rear focus type according to claim 1, satisfying the following condition:

$$1.32 < |f2/FW| < 1.65$$

where f2 is the focal length of said second lens unit.

5. A zoom lens of the rear focus type according to claim 1, wherein said third lens unit includes at least one positive lens of meniscus shape having an aspheric surface convex toward the object side.

6. A zoom lens of the rear focus type comprising, from front to rear, a first lens unit of positive refractive power, a second lens unit of negative refractive power, a third lens unit of positive refractive power and a fourth lens unit of positive refractive power, zooming from a wide-angle end to a telephoto end being performed by moving said second lens unit toward an image side, while the shift of an image plane resulting from the zooming is compensated for by moving said fourth lens unit, and focusing being performed by moving said fourth lens unit, wherein, letting a composite focal length of said third and fourth lens units in the wide-angle end be denoted by f3,4, the focal length of the entire lens system in the wide-angle end by FW, and a back focal distance in the wide-angle end by Fb, the following conditions are satisfied:

$$2.2 < |Fb/FW|$$

$$0.8 < |Fb/f3,4| < 1.1$$

7. A zoom lens of the rear focus type according to claim 6, satisfying the following conditions:

$$0.3 < |f2/\sqrt{FW \cdot FT}| < 0.4$$

$$0.9 < |\beta 2T/\sqrt{z}| < 1.23$$

where f2 is the focal length of said second lens unit, $\beta 2T$ is the image magnification of said second lens unit, FT is the longest focal length of the entire lens system, and z is a zoom ratio.

8. A zoom lens of the rear focus type according to claim 7, satisfying the following condition:

$$0.6 < e3W/\sqrt{FW \cdot FT} < 0.74$$

where e3W is an interval between principal points of said third and fourth lens unit in the wide-angle end.

9. A zoom lens of the rear focus type according to claim 8, wherein said third lens unit has at least one aspheric surface of such shape that a positive refractive power gets progressively weaker from the center of the lens surface to its marginal zone.

* * * * *

UNITED STATES PATENT AND TRADEMARK OFFICE
CERTIFICATE OF CORRECTION

PATENT NO. : 5,341,243
DATED : August 23, 1994
INVENTOR(S) : OKUYAMA ET AL.

It is certified that error appears in the above-indentified patent and that said Letters Patent is hereby corrected as shown below:

COLUMN 2:

Line 9, "1/4 in." should read --2/3 in.--.

COLUMN 9:

Line 12, "donated" should read --denoted--.

COLUMN 10:

Line 20, "Conversely" should read --Conversely,--.

COLUMN 15:

Line 6, "unit" should read --units--.

Signed and Sealed this

Fourteenth Day of February, 1995

Attest:

BRUCE LEHMAN

*Attesting Officer*      *Commissioner of Patents and Trademarks*